(12) United States Patent
Kaneiwa et al.

(10) Patent No.: US 7,419,314 B2
(45) Date of Patent: Sep. 2, 2008

(54) OPTICAL DENSITY CHANGING ELEMENT, OPTICAL ELEMENT AND PHOTOGRAPHING UNIT

(75) Inventors: Hideki Kaneiwa, Kanagawa (JP); Ryuji Shinohara, Kanagawa (JP); Atsushi Matsunaga, Kanagawa (JP); Yoshio Ishii, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 527 days.

(21) Appl. No.: 11/132,275

(22) Filed: May 19, 2005

(65) Prior Publication Data

US 2005/0259986 A1   Nov. 24, 2005

(30) Foreign Application Priority Data

May 19, 2004   (JP)   ............ P.2004-149304

(51) Int. Cl.
  *G03B 9/02*   (2006.01)
  *G02F 1/153*   (2006.01)
(52) U.S. Cl. .................... 396/506; 359/275
(58) Field of Classification Search ............ 396/241, 396/506; 359/275
  See application file for complete search history.

(56) References Cited

U.S. PATENT DOCUMENTS 6,067,184 A * 5/2000 Bonhote et al. ............ 359/265
6,700,693 B2 * 3/2004 Roberts et al. ............ 359/265
7,181,134 B2 * 2/2007 Kaneiwa et al. ................ 396/6
7,213,984 B2 * 5/2007 Kaneiwa et al. ............ 396/506
2005/0058445 A1 3/2005 Kaneiwa et al.

FOREIGN PATENT DOCUMENTS

| JP | 2000-506629 A |   | 5/2000 |
|---|---|---|---|
| JP | 2003-511837 A |   | 3/2003 |
| JP | 2005-115333 A | * | 4/2005 |
| WO | WO 97/35227 A2 |   | 9/1997 |
| WO | WO 01/27690 A2 |   | 4/2001 |

OTHER PUBLICATIONS

English translation (machine) of JP 2005-115333 A Apr. 2005.*
Patent Abstract of Japan for JP 2005-11532, Apr. 2005.*
David Cummins, et al, "Ultrafast Electrochromic Windows Based on Redox-Chromophore Modified Nanostructured Semiconducting and Conducting Films", J. Phys. Chem. B, vol. 104, 2000, pp. 11449-11459, Nov. 2000.

* cited by examiner

*Primary Examiner*—W. B. Perkey
(74) *Attorney, Agent, or Firm*—Sughrue Mion, PLLC

(57) ABSTRACT

An optical density changing element comprising: an anode; and a cathode, wherein at least one of the anode and the cathode comprises a first compound that changes a spectral absorption spectrum of the first compound in a wavelength of 400 to 700 nm by providing an electron to or receiving an electron from the at least one of the anode and the cathode, and wherein at least one of the anode and the cathode comprises a second compound that does not change a spectral absorption spectrum of the second compound in a wavelength of 400 to 700 nm by providing an electron to or receiving an electron from the at least one of the anode and the cathode.

9 Claims, 6 Drawing Sheets

US 7,419,314 B2

OPTICAL DENSITY CHANGING ELEMENT, OPTICAL ELEMENT AND PHOTOGRAPHING UNIT

BACKGROUND OF THE INVENTION

1. Field of the Invention

The present invention relates to an optical density changing element, an optical element equipped with such optical density changing element, and a photographing unit equipped with such optical element.

2. Description of the Related Art

An electrochromic material is known as a material showing a change in an optical density in response to an electromagnetic wave. The electrochromic material shows a reversible change in the optical density by an electron transfer, and is generally utilized as a material for an automotive antiglare mirror and a light regulating window.

It is reported that such electrochromic material, when adsorbed on a set of electrodes (anode and cathode), functions as an optical density changing element of a fast response speed (for example JP-T No. 2000-506629 and JP-T No. 2003-511837, and Journal of Physical Chemistry B, Vol. 104, 11449 (2000)).

Such optical density changing element is constructed by forming a layer of a semiconductor material (for example titanium oxide or antimony-doped tin oxide) of a nano-sized porous structure on the surface of a set of electrodes, adsorbing an electrochromic material in such layer and arranging such set of the electrodes in a mutually opposed relationship across an electrolyte liquid.

SUMMARY OF THE INVENTION

However, in the optical density changing element disclosed in the above mentioned Journal of Physical Chemistry B, Vol. 104, 11449 (2000), the electrochromic material has to be adsorbed on both the anode and the cathode, and an adsorption only on one electrode cannot realize a smooth electron transfer, whereby a satisfactory response speed cannot be obtained. It is therefore difficult to cause an optical density change of the electrochromic material only on one electrode, and also difficult to promote a density change in either electrochromic material in comparison with that of the other, in order to regulate the color generation in the entire optical density changing element.

An object of the present invention is to provide an optical density changing element capable of providing a color generation in an arbitrary color hue and a fast response speed.

Another object of the present invention is to provide a photographing unit provided with an optical density changing element capable of providing a color generation in an arbitrary color hue and a fast response speed.

The aforementioned objects of the present invention can be attained by an optical density changing element, an optical element and a photographing unit in the following:

(1) An optical density changing element comprising:
an anode; and
a cathode,
wherein at least one of the anode and the cathode comprises a first compound that changes a spectral absorption spectrum of the first compound in a wavelength of 400 to 700 nm by providing an electron to or receiving an electron from the at least one of the anode and the cathode, and
wherein at least one of the anode and the cathode comprises a second compound that does not change a spectral absorption spectrum of the second compound in a wavelength of 400 to 700 nm by providing an electron to or receiving an electron from the at least one of the anode and the cathode.

(2) The optical density changing element as described in (1) above,
wherein the anode comprises a second compound that does not change a spectral absorption spectrum of the second compound in a wavelength of 400 to 700 nm by providing an electron to or receiving an electron from the at least one of the anode and the cathode.

(3) The optical density changing element as described in (1) or (2) above,
wherein the anode does not comprise a first compound that changes a spectral absorption spectrum of the first compound in a wavelength of 400 to 700 nm by providing an electron to or receiving an electron from the at least one of the anode and the cathode.

(4) The optical density changing element as described in any of (1) to (3) above,
wherein the second compound has a structure represented by formula (8):

$$(A)_m\text{-B} \qquad (8)$$

wherein m represents an integer of 1 to 4;
A represents an acid group, and in case m is equal to or larger than 2, A's are mutually same or different; and
B represents a hydroxylamine or a catechol.

(5) The optical density changing element as described in any of (1) to (4) above,
wherein at least one of the anode and the cathode comprises a nanoporous semiconductor material of a roughness factor of 20 or larger.

(6) The optical density changing element as described in any of (1) to (5) above,
wherein the optical density changing element in a color erased state has an optical density of 0.2 or less at a wavelength of 400 nm.

(7) The optical density changing element as described in any of (1) to (6) above,
wherein the optical density changing element in a color erased state has an average optical density of 0.1 or less in each of a wavelength range of 400 to 500 nm, a wavelength range of 500 to 600 nm and a wavelength range of 600 to 700 nm.

(8) An optical element comprising:
an electromotive force generating element for generating an electromotive force in response to an electromagnetic wave; and
an optical density changing element as described in any of (1) to (7) above, which changes an optical density of the optical density changing element according to the electromotive force.

(9) A photographing unit comprising an optical element as described in (8) above.

(10) The photographing unit as described in (9) above, wherein the photographing unit is a film with lens.

DETAILED DESCRIPTION OF THE INVENTION

Figure 1:
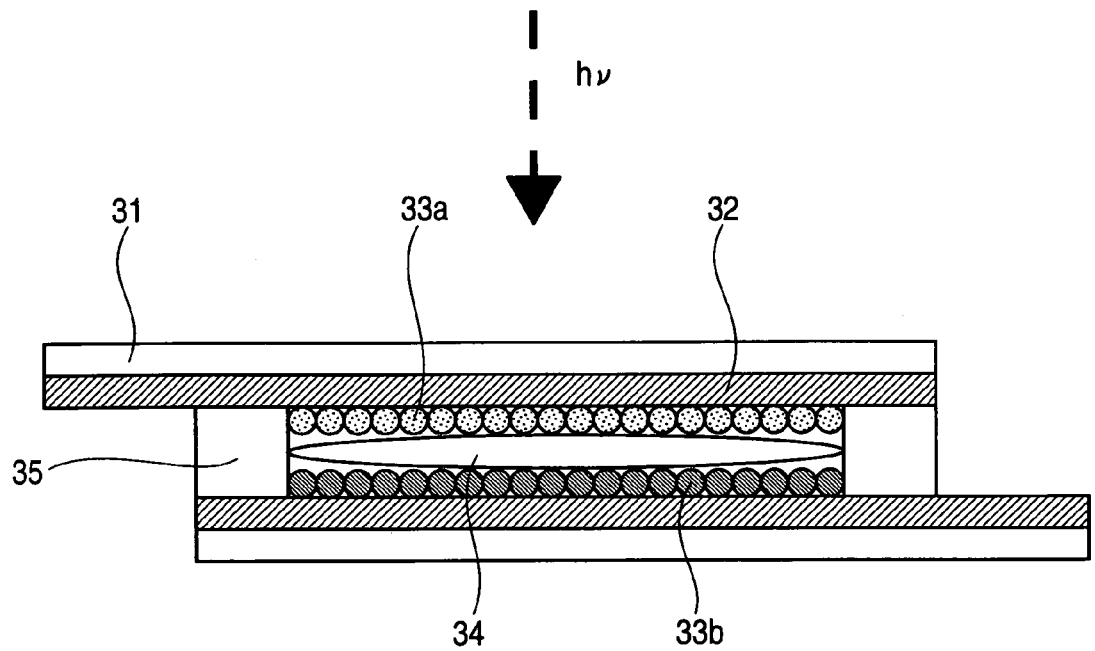
FIG. 1 shows a schematic cross-sectional view showing a representative example of configuration of an optical density changing element of the present invention.

In the following, the present invention will be clarified in detail.

In the invention, an "optical density" means a value A calculated by a following equation (1) for an intensity $I_0$ of an incident light to the optical density changing element and an intensity $I_T$ of a transmitted light:

$$A = -\log(I_T/I_0) \qquad (1)$$

In the invention, a "nanoporous material" means a material of which a surface area is increased by forming irregularities of an order of nanometers for promoting adsorption of a larger amount of materials on the surface. A level of porosity is represented by a "roughness factor".

In the invention, a "roughness factor of a nanoporous semiconductor material" is a proportion of an actually effective surface area with respect to a projected plane area of a surface of a semiconductor material layer. More specifically, it can be measured by a BET method.

In the invention, a "color erased state" means a state where an optical density changing element is maintained at an optical density as low as possible, for example by short circuiting the poles of the optical density changing element, or by applying an inverse voltage between the poles, namely applying a voltage in a direction inverse to a voltage applied at the color generation.

In the invention, a "semiconductor material" follows an ordinary definition. For example, according to Dictionary of Physics (published by Baifu-kan), the "semiconductor material" means a substance having an electrical resistance between a metal and an insulating substance.

In the invention, an "adsorption of an electrochromic material (or colorless redox material) to a nanoporous semiconductor material" means a phenomenon in which an electrochromic material (or a colorless redox material) is adsorbed by a chemical coupling or a physical coupling to the surface of a nanoporous semiconductor material, and the definition of adsorption follows an ordinary definition.

The adsorption of an electrochromic material to a nanoporous semiconductor material can be detected for example by a following method.

A nanoporous semiconductor material on which an electrochromic material is assumed to be adsorbed is immersed in a 0.1M NaOH solution and shaken for 3 hours at 40° C. A used amount of the solution is determined by a coating amount of the nanoporous semiconductor material, and is suitably 0.5 ml for a coating amount of 1 g/m². The solution after the shaking is subjected to a measurement with a spectrophotometer. As a result, there is detected an absorption band of the employed electrochromic material, and, in case the absorbance of the absorption peak is 0.01 or higher, the electrochromic material is considered to have been "adsorbed" in the nanoporous semiconductor material. A type and a concentration of the employed immersing solution (NaOH in the foregoing explanation), and a temperature and a time of shaking are determined according to the types of the nanoporous semiconductor material and the electrochromic material, and are not limited to the foregoing description.

Also a colorless redox material can be detected by a similar method. In case a detection with a spectrophotometer is difficult for example because an absorption peak is located at an extremely short wavelength, other methods such as a high-speed chromatography can be suitably utilized.

In the invention, an "electromagnetic wave" follows an ordinary definition. For example, according to Dictionary of Physics (published by Baifu-kan), an electric field and a magnetic field include a field static in time and a wave field changing in time and propagating to a distant location in space, and such wave field is defined as an electromagnetic wave. More specifically, it is classified into a γ-ray, an X-ray, an ultraviolet light, a visible light, an infrared light, and an electric wave. The electromagnetic wave considered in the invention includes all these, but, in case of applying the optical element of the invention to a light regulating system of a camera unit, it preferably relates to an ultraviolet light, a visible light and an infrared light, more preferably an ultraviolet light and a visible light.

In the following there will be explained elements constituting the optical density changing element, the optical element and the photographing unit of the invention.

The optical density changing element of the invention can change a density thereof in response to a voltage application from the exterior.

The optical density changing element of the invention includes an anode, a cathode, "a compound capable of an electron exchange with an electrode and causing a change in a spectral absorption spectrum of 400-700 nm as a result of the electron exchange" and "a compound capable of an electron exchange with an electrode and substantially not causing a change in a spectral absorption spectrum of 400-700 nm as a result of the electron exchange". The optical density changing element of the invention in a preferred embodiment is constituted of a semiconductor material in which such compounds are adsorbed, a substrate carrying an electroconductive coating, an electrolyte providing an electroconductive property in the optical density changing element.

In the invention, the "compound capable of an electron transfer to or from an electrode and causing a change in a spectral absorption spectrum of 400-700 nm as a result of the electron transfer" is called "an electrochromic material", and the "compound capable of an electron transfer to or from an electrode and substantially not causing a change in a spectral absorption spectrum of 400-700 nm as a result of the electron transfer" is called a "colorless redox material". The "colorless redox material" in the invention includes not only a colorless transparent material but also a colored material of which color is not changed.

Also "substantially not causing a change in a spectral absorption spectrum of 400-700 nm" means that an average optical density in a range of 400-700 nm is 0.05 or less, or that a maximum optical density in a range of 400-700 nm is 0.1 or less.

FIG. 1 shows a representative structure of the optical density changing element. Referring to FIG. 1, the electrochromic material and the colorless redox material are adsorbed in electrodes formed by semiconductor materials which are made porous (anode 33a and cathode 33b). The electrochromic material changes an optical density thereof in response to an electric energy supplied from upper and lower electroconductive coatings 32. In response to such change in the optical density of the electrochromic material, an incident electromagnetic wave hv is absorbed by the electrochromic material whereby a transmitted light amount is changed. The optical density changing element is not limited to the form illustrated in FIG. 1 but can assume various forms according to the application, for example, an optical filter, a lens, a diaphragm, a mirror, a window pane, eyeglasses or a display panel. For a camera unit, an optical filter, a lens or a diaphragm is preferable.

A substrate constituting the optical density changing element is not particularly restricted, and can be, for example, glass, plastics, polyethylene terephthalate (PET), polyethylene naphthalate (PEN), triacetyl cellulose (TAC), polycarbonate (PC), polysulfone, polyethersulfone (PES), polyether ether ketone, polyphenylene sulfide, polyarylate (PAR), polyamide, polyimide (PIM), polystyrene, a norbornene resin (Arton), an acrylic resin, or polymethyl methacrylate (PMMA), which can be suitably selected according to the application and the form. There is preferably selected a material showing little absorption to the electromagnetic wave of the object of the optical device of the invention, and, glass, PET, PEN, TAC or acrylic resin is particularly preferable for the light of $\lambda=400\text{-}700$ nm. Also for avoiding a loss of the transmitted light by a reflection on the substrate surface, an antireflective layer (for example a thin silicon oxide layer) is preferably provided thereon. Also various functional layers may be provided on the surface, such as an impact absorbing layer for preventing the element from an impact, an antiscratch layer for preventing the element from scratch, and an electromagnetic wave absorbing layer for cutting off an unintended electromagnetic wave (for example ultraviolet light in an optical device for visible light).

An electroconductive layer constituting the optical density changing element is not particularly restricted, and can be formed, for example, of a metal film (gold, silver, copper, chromium, palladium, tungsten or an alloy thereof), an oxide semiconductor film (tin oxide, silver oxide, zinc oxide, vanadium oxide, ITO (indium oxide doped with tin oxide), antimony-doped tin oxide (ATO), FTO (fluorine-doped tin oxide), AZO (aluminum-doped zinc oxide), a conductive nitride film (titanium nitride, zirconium nitride, or hafnium nitride), a conductive boronide film ($LaB_6$), a spinel compound ($MgInO_4$ or $CaGaO_4$), an electroconductive polymer film (polypyrrole/$FeCl_3$), an ionic conductive film (polyethylene oxide/$LiClO_4$), or an inorganic/organic composite film (indium oxide powder/saturated polyester resin). It is preferable to select a material of low absorption to the electromagnetic wave of the object of the optical device of the invention, and tin oxide, FTO or ITO is particularly preferable for the light of $\lambda=400\text{-}700$ nm. Also in order to reduce the absorption of the electromagnetic wave of the object, the electroconductive layer is preferably made as thin as possible within an extent that the electrical conductivity can be secured. More specifically, the electroconductive layer preferably has a thickness of 1000 nm or less, more preferably 200 nm or less and particularly preferably 100 nm or less.

A semiconductor material constituting the optical density changing element is not particularly restricted to following examples, but can be formed by a metal oxide, a metal sulfide or a metal nitride.

A metal oxide can be, though not restrictive, titanium oxide, zinc oxide, silicon oxide, lead oxide, tungsten oxide, tin oxide, indium oxide, niobium oxide, cadmium oxide, bismuth oxide, aluminum oxide, ferrous oxide or a composite compound thereof, or such compound doped with fluorine, chlorine, antimony, phosphor, arsine, boron, aluminum, indium, gallium, silicon, germanium, titanium, zirconium, hafnium or tin. There can also be employed titanium oxide surfacially coated with ITO, antimony-doped tin oxide or FTO.

A metal sulfide can be, though not restrictive, zinc sulfide, cadmium sulfide or a composite compound thereof, or such compound doped with aluminum, gallium, or indium. There can also be employed another material surfacially coated with a metal sulfide.

A metal nitride can be, though not restrictive, aluminum nitride, gallium nitride, indium nitride or a composite compound thereof, or such compound doped with a small amount of different atoms (tin, germanium etc.). There can also be employed another material surfacially coated with a metal nitride. It is preferable to select a material of low absorption for the electromagnetic wave of the object of the optical device of the invention, and, for the light of $\lambda=400\text{-}700$ nm, titanium oxide, tin oxide, zinc oxide, zinc sulfide or gallium nitride is preferable, and tin oxide or zinc oxide is particularly preferable.

In the invention, an adsorption of the electrochromic material and the colorless redox material on such semiconductor material realizes smooth injection and ejection of electrons in the electrochromic element and the colorless redox material, thereby achieving a change in the optical density of the optical density changing element within a short time. A larger adsorption amount of the electrochromic material and the colorless redox material on the semiconductor material enables a stronger color generation. In order to achieve an adsorption of the electrochromic material and the colorless redox material in a larger amount, the semiconductor material is preferably given a nanoporous structure to obtain a larger surface area, preferably with a roughness factor of 20 or higher, particularly preferably 150 or higher.

Such porous structure can be formed, for example, by binding ultra fine particles of a nanometer order. In such case, by optimizing a size and a size dispersion of the employed particles, it is possible to minimize a loss in the transmitted light, caused by absorption or scattering of the electromagnetic wave in the semiconductor material. A size of the employed particles is preferably 100 nm or less, more preferably 1 to 60 nm, and further preferably 2 to 40 nm. Also a dispersion of the size is preferably a single dispersion. It is also possible to improve the response speed of the optical element of the invention, also by optimizing the particle size and the size dispersion.

In the invention, the semiconductor material, in which the electrochromic material and the colorless redox material are adsorbed, may be employed in two or more layers. In such case, the layers may have a same composition or different compositions. Also the electrochromic material and the colorless redox material may be contained in a same layer or in different layers. Also a semiconductor material, in which the electrochromic material and/or the colorless redox material is adsorbed, may be combined with a semiconductor material in which the electrochromic material is not adsorbed.

An electrochromic material constituting the optical density changing element can be an organic dye such as a viologen dye, a phenothiazine dye, a styryl dye, a ferrocene dye, an anthraquinone dye, a pyrazoline dye, a fluoran dye, or a phthalocyanine dye; an electroconductive polymer such as polystyrene, polythiophene, polyaniline, polypyrrole, polybenzine, or polyisothianaphthene; or an inorganic compound such as tungsten oxide, iridium oxide, nickel oxide, cobalt oxide, vanadium oxide, molybdenum oxide, titanium oxide, indium oxide, chromium oxide, manganese oxide, Prussian blue, indium nitride, tin nitride, or zirconium nitrochloride.

In the invention, in case a specified part of an organic compound is called a "group", such part may not be substituted or may be substituted with a substituent (up to a possible maximum number) of one or more kinds. For example an "alkyl group" means a substituted or non-substituted alkyl group.

Such substituent, represented by W, is not particularly restricted and can be, for example, a halogen atom, an alkyl group (including a cycloalkyl group, a bicycloalkyl group, and a tricycloalkyl group), an alkenyl group (including a cycloalkenyl group, and a bicycloalkenyl group), an alkinyl group, an aryl group, a heterocyclic group, a cyano group, a hydroxyl group, a nitro group, a carboxyl group, an alkoxy group, an aryloxy group, a silyloxy group, a heterocyclic oxy group, an acyoxy group, a carbamoyloxy group, an alkoxycarbonyloxy group, an aryloxycarbonyloxy group, an amino group (including an alkylamino group, an arylamino group and a heterocyclic amino group), an ammonio group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, a sulfo group, an alkyl- or aryl-sulfinyl group, an alkyl- or aryl-sulfonyl group, an acyl group, an aryloxycarbonyl group, an alkoxycarbonyl group, a carbamoyl group, an aryl or heterocyclic azo group, an imido group, a phosphino group, a phosphinyl group, a phosphinyloxy group, a phosphinylamino group, a phosphono group, a silyl group, a hydrazino group, an ureido group, a boronic acid group (—B(OH)$_2$), a phosphato group (—OPO(OH)$_2$), a sulfato group (—OSO$_3$H, or other known substituents.

Also two Ws may be combined to form a ring (an aromatic or non-aromatic hydrocarbon ring, or a heterocycle, which may further be combined to form a polycondensed rings; such as a benzene ring, a naphthalene ring, an anthracene ring, a phenanthrene ring, a fluorene ring, a triphenylene ring, a naphthacene ring, a biphenyl ring, a pyrrole ring, a furan ring, a thiophene ring, an imidazole ring, an oxazole ring, a thiazole ring, a pyridine ring, a pyrazine ring, a pyrimidine ring, a pyridazine ring, an indolizine ring, an indole ring, a benzofuran ring, a benzothiophene ring, an isobenzofuran ring, a quinolidine ring, a quinoline ring, a phthalazine ring, a naphthylidine ring, a quinoxaline ring, a quinoxazoline ring, an isoquinoline ring, a carbazole ring, a phenanthridine ring, an acrydine ring, a phenanthroline ring, a thianthrene ring, a chromen ring, a xanthene ring, a phenoxathine ring, a phenothiazine ring, or a phenazine ring).

In the aforementioned substituents W, any hydrogen atom present therein may be removed and substituted by the aforementioned group. Examples of such substituent include —CONHSO$_2$— (a sulfonylcarbamoyl group or a carbonylsulfamoyl group), —CONHCO— (a carbonylcarbamoyl group) and —SO$_2$NHSO$_2$— (a sulfonylsulfamoyl group). More specific examples include an alkylcarbonylaminosulfonyl group (such as acetylaminosulfonyl), an arylcarbonylaminosulfonyl group (such as benzoylaminosulfonyl group), an alkylsulfonylaminocarbonyl group (such as methylsulfonylaminocarbonyl), and an arylsulfonylaminocarbonyl group (such as p-methylphenylsulfonylaminocarbonyl).

A viologen dye is a compound represented by structures shown in general formulas (1) to (3):

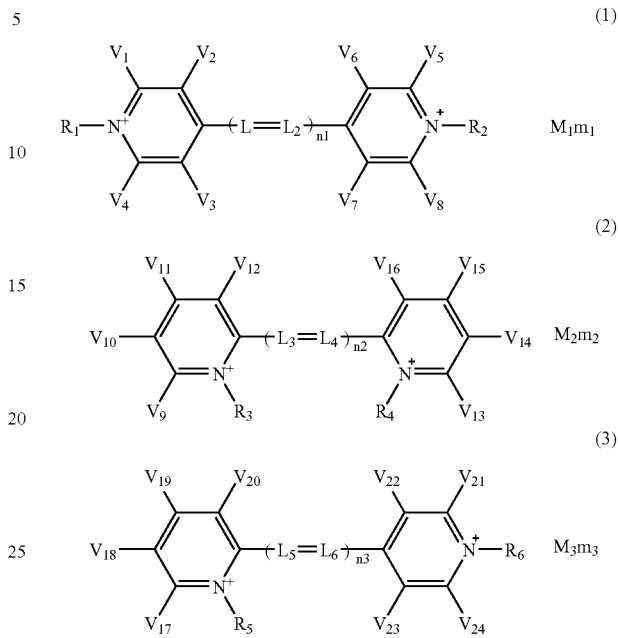

In the general formulas (1), (2) and (3), $V_1$, $V_2$, $V_3$, $V_4$, $V_5$, $V_6$, $V_7$, $V_8$, $V_9$, $V_{10}$, $V_{11}$, $V_{12}$, $V_{13}$, $V_{14}$, $V_{15}$, $V_{16}$, $V_{17}$, $V_{18}$, $V_{19}$, $V_{20}$, $V_{21}$, $V_{22}$, $V_{23}$ and $V_{24}$ each independently represents a hydrogen atom or a monovalent substituent.

$R_1$, $R_2$, $R_3$, $R_4$, $R_5$ and $R_6$ each independently represents a hydrogen atom, an alkyl group, an aryl group or a heterocyclic group.

$L_1$, $L_2$, $L_3$, $L_4$, $L_5$ and $L_6$ each independently represents a methine group or a nitrogen atom.

$n_1$, $n_2$ and $n_3$ each independently represents 0, 1 or 2.

$M_1$, $M_2$ and $M_3$ each independently represents a charge balancing counter ion, and $m_1$, $m_2$ and $m_3$ each independently represents a number equal to or larger than 0 necessary for neutralizing the charge of a molecule.

$V_1$, $V_2$, $V_3$, $V_4$, $V_5$, $V_6$, $V_7$, $V_8$, $V_9$, $V_{10}$, $V_{11}$, $V_{12}$, $V_{13}$, $V_{14}$, $V_{15}$, $V_{16}$, $V_{17}$, $V_{18}$, $V_{19}$, $V_{20}$, $V_{21}$, $V_{22}$, $V_{23}$ and $V_{24}$ each independently represents a hydrogen atom or a monovalent substituent, and Vs may be mutually bonded or may form a ring, or V may be bonded with $R_1$-$R_6$ or $L_1$-$L_6$.

The monovalent substituent can be W mentioned above.

$R_1$, $R_2$, $R_3$, $R_4$, $R_5$ and $R_6$ each independently represents a hydrogen atom, an alkyl group, an aryl group or a heterocyclic group, preferably an alkyl group, an aryl group or a heterocyclic group, and further preferably an alkyl group or an aryl group, and particularly preferably an alkyl group. Specific preferred examples of the alkyl group, the aryl group and the heterocyclic group represented as $R_1$-$R_6$ include a non-substituted alkyl group preferably with 1-18 carbon atoms, more preferably with 1-7 carbon atoms and particularly preferably with 1-4 carbon atoms (such as methyl, ethyl, propyl, isopropyl, butyl, isobutyl, hexyl, octyl, dodecyl or octadecyl), and a substituted alkyl group preferably with 1-18 carbon atoms, more preferably with 1-7 carbon atoms and particularly preferably with 1-4 carbon atoms, for example it can be an alkyl group substituted with the aforementioned W as a substituent. In particular there is preferred an alkyl group having an acid group. The acid group means a group having a dissociable proton and releasing a proton depending upon pka and an environmental pH, such as a sulfo group, a carboxyl group, a sulfato group, a —CONHSO$_2$— group (sulfonylcarbamoyl group or carbonylsulfamoyl group), a —CONHCO— group (carbonylcarbamoyl group), a —SO$_2$NHSO$_2$— group (sulfonylsulfamoyl group), a sulfonamide group, a sulfamoyl group, a phosphato (—OP(=O)(OH)$_2$) group, a phosphono group (—P(=O)(OH)$_2$) group, a boronic acid group, or a phenolic hydroxyl group. For example there is preferred a proton releasing acidic group capable of dissociation of 90% or more within a pH range of 5-11, more preferably a sulfo group, a carboxyl group, a —CONHSO$_2$— group, a —CONHCO— group, a —SO$_2$NHSO$_2$— group, a phosphato group, or a phosphono group, and further preferably a carboxyl group, a phosphato group, or a phosphono group, and particularly preferably a phosphato group or a phosphono group and most preferably a phosphono group.

Specific preferred examples include an aralkyl group (such as benzyl, 2-phenylethyl, 2-(4-biphenyl)ethyl, 2-sulfobenzyl, 4-sulfobenzyl, 4-sulfophenethyl, 4-phosphobenzyl or 4-carboxybenzyl), an unsaturated hydrocarbon group (such as an allyl group or a vinyl group (thus a substituted alkyl group also including an alkenyl group and an alkinyl group)), a hydroxyalkyl group (such as 2-hydroxyethyl or 3-hydroxypropyl), a carboxyalkyl group (such as carboxymethyl, 2-carboxylethyl, 3-carboxypropyl, or 4-carboxybutyl), a phosphatoalkyl group (such as phosphatomethyl, 2-phosphatoethyl, 3-phosphatopropyl, or 4-phosphatobutyl), a phosphonoalkyl group (such as phosphonomethyl, 2-phosphonoethyl, 3-phosphonopropyl, or 4-phosphonobutyl), an alkoxyalkyl group (such as 2-methoxyethyl or 2-(2-methoxyethoxy) ethyl), an aryloxyalkyl group (such as 2-phenoxyethyl, 2-(4-biphenyloxy)ethyl, 2-(1-naphthoxy) ethyl, 2-(4-sulfophenoxy)ethyl, or 2-(2-phosphophenoxy) ethyl), an alkoxycarbonylalkyl group (such as ethoxycarbonylmethyl, or 2-benzyloxycarbonylethyl), an aryloxycarbonylalkyl group (such as 3-phenoxycarbonylpropyl or 3-sulfophenoxycarbonylpropyl), an acyloxyalkyl group (such as 2-acetyloxyethyl), an acylalkyl group (such as 2-acetylethyl), a carbamoylalkyl group (such as 2-morpholinocarbonylethyl), a sulfamoylalkyl group (such as N,N-dimethylsulfamoylmethyl), a sulfoalkyl group (such as 2-sulfoethyl, 3-sulfopropyl, 3-sulfobutyl, 4-sulfobutyl, 2-[3-sulfopropoxy]ethyl, 2-hydroxy-3-sulfopropyl, 3-sulfopropoxyethoxyethyl, 3-phenyl-3-sulfopropyl, 4-phenyl-4-sulfobutyl, or 3-(2-pyridyl)-3-sulfopropyl), a sulfoalkenyl group, a sulfatoalkyl group (such as 2-sulfatoethyl group, 3-sulfatopropyl or 4-sulfatobutyl), a heterocycle-substituted alkyl group (such as 2-(pyrrolidin-2-on-1-yl)ethyl, 2-(2-pyridyl)ethyl, tetrahydrofurfuryl or 3-pyridiniopropyl), an alkylsulfonylcarbamoylalkyl group (such as methanesulfonylcarbamoylmethyl group), an acylcarbamoylalkyl group (such as acetylcarbamoylmethyl group), an acylsulfamoylalkyl group (such as acetylsulfamoylmethyl group), an alkylsulfonylsulfamoylalkyl group (such as methanesulfonylsulfamoylmethyl group), an ammonioalkyl group (such as 3-(trimethylammonio)propyl or 3-ammoniopropyl), an aminoalkyl group (such as 3-aminopropyl, 3-(dimethylamino) propyl, or 4-(methylamino)butyl) and a guanidinoalkyl group (such as 4-guanidinobutyl)}.

Preferred examples also include a substituted or non-substituted aryl group preferably with 6 to 20 carbon atoms, more preferably 6 to 10 carbon atoms and particularly preferably 6 to 8 carbon atoms (substituted aryl group can be, for example, an aryl group substituted with W cited above as examples of the substituent, preferably an aryl group having an acid group, more preferably an aryl group substituted with a carboxyl group, a phosphate group or a phosphono group, particularly preferably an aryl group substituted with a phosphate group or a phosphono group, and most preferably an aryl group substituted with a phosphono group; and specific examples including phenyl, 1-naphthyl, p-methoxyphenyl, p-methylphenyl, p-chlorophenyl, biphenyl, 4-sulfophenyl, 4-sulfonaphthyl, 4-carboxyphenyl, 4-phosphatophenyl or 4-phosphonophenyl), and a substituted or non-substituted heterocyclic group preferably with 1 to 20 carbon atoms, more preferably 3 to 10 carbon atoms and particularly preferably 4 to 8 carbon atoms (substituted heterocyclic group can be, for example, a heterocyclic group substituted with W cited above as examples of the substituent, preferably a heterocyclic group having an acid group, more preferably a heterocyclic group substituted with a carboxyl group, a phosphato group or a phosphono group, particularly preferably a heterocyclic group substituted with a phosphato group or a phosphono group, and most preferably a heterocyclic group substituted with a phosphono group; and specific examples including 2-furyl, 2-thienyl, 2-pyridyl, 3-pyrazolyl, 3-isooxazolyl, 3-isothiazolyl, 2-imidazolyl, 2-oxazolyl, 2-thiazolyl, 2-pyridazyl, 2-pyrimidyl, 3-pyrazyl, 2-(1,3,5-triazolyl), 3-(1, 2,4-triazolyl), 5-tetrazolyl, 5-methyl-2-thienyl, 4-methoxy-2-pyridyl, 4-sulfo-2-pyridyl, 4-carboxy-2-pyridyl, 4-phosphato-2-pyridyl or 4-phosphono-2-pyridyl).

Such group may be bonded with another R, $V_1$-$V_{24}$ or $L_1$-$L_6$.

$L_1$, $L_2$, $L_3$, $L_4$, $L_5$ and $L_6$ each independently represents a methine group or a nitrogen atom, preferably a methine group. The methine group represented by $L_1$-$L_6$ may have a substituent, which can be W mentioned above. The substituent can be, for example, a substituted or non-substituted alkyl group with 1 to 15 carbon atoms, preferably 1 to 10 carbon atoms and particularly preferably 1 to 5 carbon atoms (such as methyl, ethyl, 2-carboxyethyl, 2-phosphatoethyl or 2-phosphonoethyl), a substituted or non-substituted aryl group with 6 to 20 carbon atoms, preferably 6 to 15 carbon atoms and further preferably 6 to 10 carbon atoms (such as phenyl, o-carboxyphenyl, o-phosphatophenyl or o-phosphonophenyl), a substituted or non-substituted heterocyclic group with 3 to 20 carbon atoms, preferably 4 to 15 carbon atoms and further preferably 6 to 10 carbon atoms (such as an N,N-dimethylbarbituric acid group), a halogen atom (such as chlorine, bromine, iodine or fluorine), an alkoxy group with 1 to 15 carbon atoms, preferably 1 to 10 carbon atoms and particularly preferably 1 to 5 carbon atoms (such as methoxy or ethoxy), an amino group with 0 to 15 carbon atoms, preferably 2 to 10 carbon atoms and particularly preferably 4 to 10 carbon atoms (such as methylamino, N,N-dimethylamino or N-methyl-N-phenylamino, or N-methyl-piperadino), an alkylthio group with 1 to 15 carbon atoms, preferably 1 to 10 carbon atoms and particularly preferably 1 to 5 carbon atoms (such as methylthio or ethylthio), and an arylthio group with 6 to 20 carbon atoms, preferably 6 to 12 carbon atoms and particularly preferably 6 to 10 carbon atoms (such as phenylthio or p-methylphenylthio). It may also be bonded with another methine group to form a ring, or bonded with $V_1$-$V_{24}$ or $R_1$-$R_6$.

$n_1$, $n_2$ and $n_3$ each independently represents 0, 1 or 2, preferably 0 or 1, and further preferably 0. In case $n_1$-$n_3$ are 2 or larger, methine groups or nitrogens are repeated, but they need not be same.

$M_1$, $M_2$ and $M_3$ are included in the formula for indicating presence of a cation or an anion when needed to neutralize the ionic charge of the compound. A typical cation can be an inorganic cation such as a hydrogen ion ($H^+$), an alkali metal ion (such as sodium ion, potassium ion, or lithium ion), or an alkali earth metal ion (such as calcium ion), or an organic cation such as an ammonium ion (ammonium ion, tetraalkylammonium ion, triethylammonium ion, pyridinium ion, ethylpyridinium ion or 1,8-diazabicyclo[5,4,0]-7-undecenium ion).

An anion can be an inorganic anion or an organic anion for example a halogen anion (such as fluorine ion, chlorine ion or iodine ion), a substituted arylsulfonic acid anion (such as p-toluenesulfonic acid ion or p-chlorobenzenesulfonic acid ion), an aryldisulfonic acid ion (such as 1,3-benzenedisulfonic acid ion, 1,5-naphthalenedisulfonic acid ion, or 2,6-naphthalenedisulfonic acid ion), an alkylsulfuric acid ion (such as methylsulfuric acid ion), sulfuric acid ion, thiocyanic acid ion, perchloric acid ion, tetrafluoroboric acid ion, picric acid ion, acetic acid ion or trifluoromethanesulfonic acid ion. It is also possible to utilize another dye having a charge opposite to that of the ionic polymer or the dye. $CO_2^-$, $SO_3^-$, and $P(=O)(-O^-)_2$ can be represented, when having a hydrogen ion as a counter ion, as $CO_2H$, $SO_3H$ and $P(=O)(-OH)_2$.

$m_1$, $m_2$ and $m_3$ represent numbers of 0 or larger required for balancing the charge, preferably numbers of 0 to 4, more preferably 0 to 2, and 0 in case an intramolecular salt is formed.

In the following, examples of the viologen dye are shown, but the present invention is not limited to such examples.

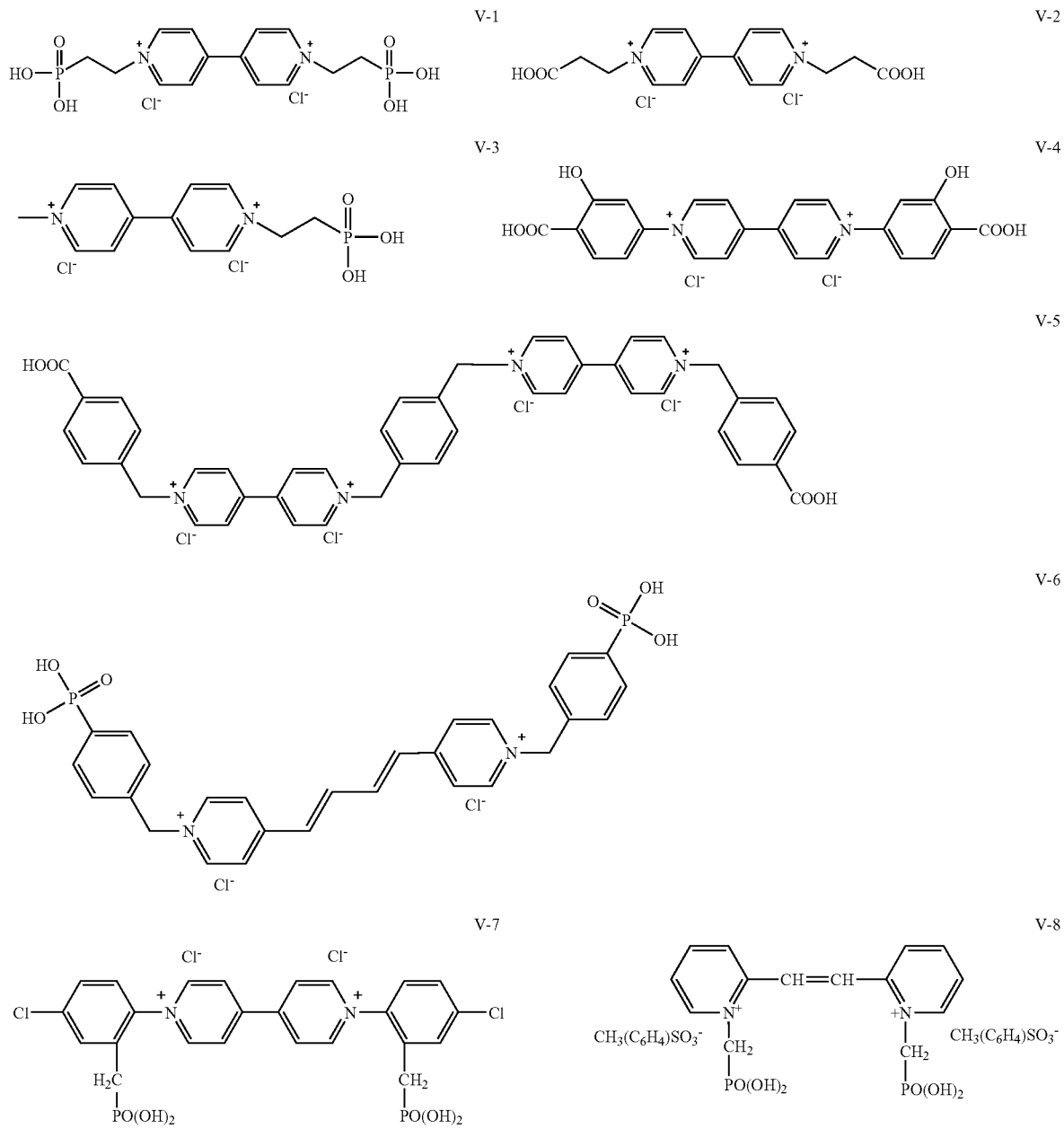

-continued

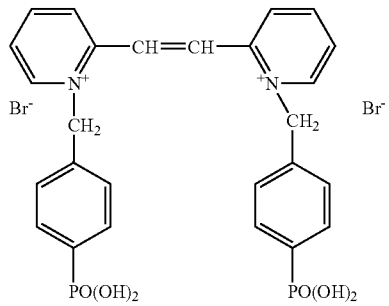
V-9

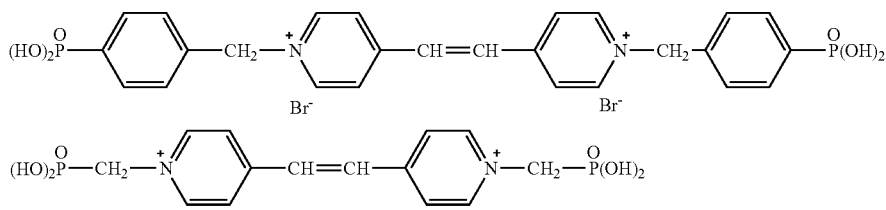
V-10

V-11

A phenothiazine dye is a compound represented by a following general formula (6).

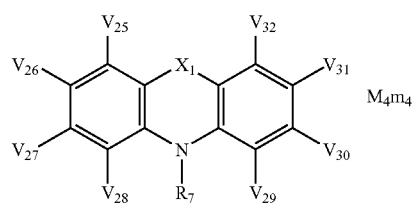
(6)

In the general formulas (6), $V_{25}$, $V_{26}$, $V_{27}$, $V_{28}$, $V_{29}$, $V_{30}$, $V_{31}$ and $V_{32}$ each independently represents a hydrogen atom or a monovalent substituent, and Vs may be mutually bonded or may form a ring, or V may be bonded with another $R_7$. The monovalent substituent can be W cited above.

$R_7$ represents a hydrogen atom, an alkyl group, an aryl group or a heterocyclic group, preferably an alkyl group, an aryl group or a heterocyclic group, and further preferably an alkyl group or an aryl group, and particularly preferably an alkyl group. Specific preferred examples of the alkyl group, the aryl group and the heterocyclic group represented as $R_7$ include a non-substituted alkyl group preferably with 1-18 carbon atoms, more preferably with 1-7 carbon atoms and particularly preferably with 1-4 carbon atoms (such as methyl, ethyl, propyl, isopropyl, butyl, isobutyl, hexyl, octyl, dodecyl or octadecyl), and a substituted alkyl group preferably with 1-18 carbon atoms, more preferably with 1-7 carbon atoms and particularly preferably with 1-4 carbon atoms {For example it can be an alkyl group substituted with the aforementioned W as a substituent, in particular an alkyl group having an acid group. The acid group is a group having a dissociable proton and releasing a proton depending upon pKa and an environmental pH, such as a sulfo group, a carboxyl group, a sulfato group, a —CONHSO$_2$— group (sulfonylcarbamoyl group or carbonylsulfamoyl group), a —CONHCO— group (carbonylcarbamoyl group), a —SO$_2$NHSO$_2$— group (sulfonylsulfamoyl group), a sulfonamide group, a sulfamoyl group, a phosphato (—OP(=O)(OH)$_2$) group, a phosphono group (—P(=O)(OH)$_2$) group, a boronic acid group, or a phenolic hydroxyl group. For example there is preferred a proton releasing acidic group capable of dissociation of 90% or more within a pH range of 5-11, more preferably a sulfo group, a carboxyl group, a —CONHSO$_2$— group, a —CONHCO— group, a —SO$_2$NHSO$_2$— group, a phosphato group, or a phosphono group, and further preferably a carboxyl group, a phosphato group, or a phosphono group, and particularly preferably a phosphato group or a phosphono group and most preferably a phosphono group.

Specific preferred examples include an aralkyl group (such as benzyl, 2-phenylethyl, 2-(4-biphenyl)ethyl, 2-sulfobenzyl, 4-sulfobenzyl, 4-sulfophenethyl, 4-phosphobenzyl or 4-carboxybenzyl), an unsaturated hydrocarbon group (such as an allyl group or a vinyl group (thus a substituted alkyl group also including an alkenyl group and an alkinyl group)), a hydroxyalkyl group (such as 2-hydroxyethyl or 3-hydroxypropyl), a carboxyalkyl group (such as carboxymethyl, 2-carboxyethyl, 3-carboxypropyl, or 4-carboxybutyl), a phosphatoalkyl group (such as phosphatomethyl, 2-phosphatoethyl, 3-phosphatopropyl, or 4-phosphatobutyl), a phosphonoalkyl group (such as phosphonomethyl, 2-phosphonoethyl, 3-phosphonopropyl, or 4-phosphonobutyl), an alkoxyalkyl group (such as 2-methoxyethyl or 2-(2-methoxyethoxy) ethyl), an aryloxyalkyl group (such as 2-phenoxyethyl, 2-(4-biphenyloxy)ethyl, 2-(1-naphthoxy)ethyl, 2-(4-sulfophenoxy)ethyl, or 2-(2-phosphophenoxy)ethyl), an alkoxycarbonylalkyl group (such as ethoxycarbonylmethyl, or 2-benzyloxycarbonylethyl), an aryloxycarbonylalkyl group (such as 3-phenoxycarbonylpropyl or 3-sulfophenoxycarbonylpropyl), an acyloxyalkyl group (such as 2-acetyloxyethyl), an acylalkyl group (such as 2-acetylethyl), a carbamoylalkyl group (such as 2-morpholinocarbonylethyl), a sulfamoylalkyl group (such as N,N-dimethylsulfamoylmethyl), a sulfoalkyl group (such as 2-sulfoethyl, 3-sulfopropyl, 3-sulfobutyl, 4-sulfobutyl, 2-[3-sulfopropoxy]ethyl, 2-hydroxy-3-sulfopropyl, 3-sulfopropoxyethoxyethyl, 3-phenyl-3-sulfopropyl, 4-phenyl-4-sulfobutyl, or 3-(2-pyridyl)-3-sulfopropyl), a sulfoalkenyl group, a sulfatoalkyl group (such as 2-sulfatoethyl group, 3-sulfatopropyl or 4-sulfatobutyl), a heterocycle-substituted alkyl group (such as 2-(pyrrolidin-2-on-1-yl)ethyl, 2-(2-pyridyl)ethyl, tetrahydrofurfuryl or 3-pyridiniopropyl), an alkylsulfonylcarbamoylalkyl group (such as methanesulfonylcarbamoylmethyl group), an acylcarbamoylalkyl group (such as acetylcarbamoylmethyl group), an acylsulfamoylalkyl group (such as acetylsulfamoylmethyl group), an alkylsulfonylsulfamoylalkyl group (such as methanesulfonylsulfamoylmethyl group), an ammonioalkyl group (such as 3-(trimethylammonio)propyl or 3-ammoniopropyl), an aminoalkyl group (such as 3-aminopropyl, 3-(dimethylamino)propyl, or 4-(methylamino)butyl) and a guanidinoalkyl group (such as 4-guanidinobutyl)}.

Preferred examples also include a substituted or non-substituted aryl group preferably with 6 to 20 carbon atoms, more preferably 6 to 10 carbon atoms and particularly preferably 6 to 8 carbon atoms (substituted aryl group can be, for example, an aryl group substituted with W cited above as examples of the substituent, preferably an aryl group having an acid group, more preferably an aryl group substituted with a carboxyl group, a phosphato group or a phosphono group, particularly preferably an aryl group substituted with a phosphato group or a phosphono group, and most preferably an aryl group substituted with a phosphono group; and specific examples including phenyl, 1-naphthyl, p-methoxyphenyl, p-methylphenyl, p-chlorophenyl, biphenyl, 4-sulfophenyl, 4-sulfonaphthyl, 4-carboxyphenyl, 4-phosphatophenyl or 4-phosphonophenyl), and a substituted or non-substituted heterocyclic group preferably with 1 to 20 carbon atoms, more preferably 3 to 10 carbon atoms and particularly preferably 4 to 8 carbon atoms (substituted heterocyclic group can be, for example, a heterocyclic group substituted with W cited above as examples of the substituent, preferably a heterocyclic group having an acid group, more preferably a heterocyclic group substituted with a carboxyl group, a phosphato group or a phosphono group, particularly preferably a heterocyclic group substituted with a phosphato group or a phosphono group, and most preferably a heterocyclic group substituted with a phosphono group; and specific examples including 2-furyl, 2-thienyl, 2-pyridyl, 3-pyrazolyl, 3-isooxazolyl, 3-isothiazolyl, 2-imidazolyl, 2-oxazolyl, 2-thiazolyl, 2-pyridazyl, 2-pyrimidyl, 3-pyrazyl, 2-(1,3,5-triazolyl), 3-(1,2,4-triazolyl), 5-tetrazolyl, 5-methyl-2-thienyl, 4-methoxy-2-pyridyl, 4-sulfo-2-pyridyl, 4-carboxy-2-pyridyl, 4-phosphato-2-pyridyl or 4-phosphono-2-pyridyl).

It may also be bonded to $V_{25}$-$V_{32}$.

$X_1$ represents a sulfur atom, an oxygen atom, a nitrogen atom (N—Ra), a carbon atom (CVaVb), or a selenium atom, preferably a sulfur atom. Ra represents a hydrogen atom, an alkyl group, an aryl group or a heterocyclic group, and can be and is preferably similar to $R_1$-$R_7$ mentioned above. Va and Vb each represents a hydrogen atom or a monovalent substituent, and can be and is preferably similar to $V_1$-$V_{32}$ mentioned above.

$M_4$ is included in the formula for indicating presence of a cation or an anion when needed to neutralize the ionic charge of the compound. A typical cation can be an inorganic cation such as a hydrogen ion ($H^+$), an alkali metal ion (such as sodium ion, potassium ion, or lithium ion), or an alkali earth metal ion (such as calcium ion), or an organic cation such as an ammonium ion (ammonium ion, tetraalkylammonium ion, triethylammonium ion, pyridinium ion, ethylpyridinium ion or 1,8-diazabicyclo[5,4,0]-7-undecenium ion). An anion can be an inorganic anion or an organic anion for example a halogen anion (such as fluorine ion, chlorine ion or iodine ion), a substituted arylsulfonic acid anion (such as p-toluenesulfonic acid ion or p-chlorobenzenesulfonic acid ion), an aryldisulfonic acid ion (such as 1,3-benzenesulfonic acid ion, 1,5-naphthalenedisulfonic acid ion, or 2,6-naphthalenedisulfonic acid ion), an alkylsulfuric acid ion (such as methylsulfuric acid ion), sulfuric acid ion, thiocyanic acid ion, perchloric acid ion, tetrafluoroboric acid ion, picric acid ion, acetic acid ion or trifluoromethanesulfonic acid ion. It is also possible to utilize another dye having a charge opposite to that of the ionic polymer or the dye. $CO_2^-$, $SO_3^-$, and $P(=O)(-O-)_2$ can be represented, when having a hydrogen ion as a counter ion, as $CO_2H$, $SO_3H$ and $P(=O)(-OH)_2$.

$m_4$ represents a number of 0 or larger required for balancing the charge, preferably a number of 0 to 4, more preferably 0 to 2, and 0 in case an intramolecular salt is formed.

In the following, examples of the phenothiazine dye are shown, but the present invention is not limited to such examples.

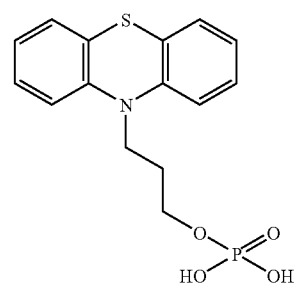

P-1

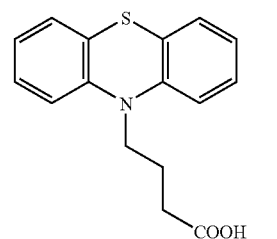

P-2

A styryl dye is a compound having a basic skeleton represented by a following formula (7).

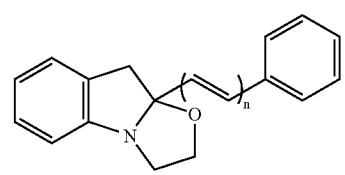

(7)

In the formula, n represents 1-5. This compound may have an arbitrary substituent in an arbitrary position, and it is particularly preferable to have an adsorbing substituent such as a carboxyl group, a sulfonic acid group or a phosphonic acid group. Following compounds are shown as specific examples, but the invention is not limited to such examples.

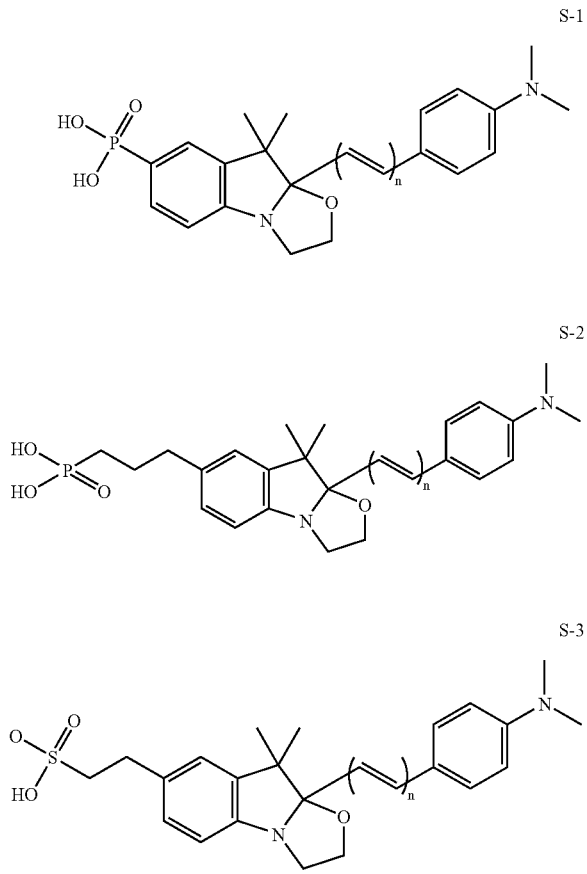

Among such electrochromic materials, an organic compound can control its absorption wavelength by changing substituents thereof. It is also preferable to employ two or more electrochromic materials capable of changing the optical density, whereby the optical density changing element can change the optical densities at different wavelengths.

In case of utilizing an optical element of the invention as a light regulating element for a camera unit or the like, it preferably has absorption characteristics close to neutral gray corresponding to a uniform light absorption, and the optical density changing element is preferably capable of absorbing visible light, preferably visible light of plural different wavelengths, and more preferably blue, green and red lights. Such characteristics can be realized by a combination of plural materials in the visible region. Preferred examples of the combination of two or more kinds include viologen dye/phenothiazine dye, viologen dye/ferrocene dye, phthalocyanine dye/Prussian blue, viologen dye/nickel oxide, viologen dye/iridium oxide, tungsten oxide/phenothiazine dye, viologen dye/phenothiazine dye/styryl dye, two viologen dyes (different in substituent)/phenothiazine dye, two viologen dyes (different in substituent)/styryl dye, and two viologen dyes (different in substituent)/nickel oxide.

The optical density changing element of the present invention includes, in order to regulate an electrochemical reaction of such electrochromic material, a colorless redox material in at least either of an anode side and a cathode side. As in the case of the electrochromic material, the colorless redox material is preferably adsorbed in a nanoporous semiconductor material of an anode surface of a cathode surface.

The colorless redox material is preferably present in the anode side. In case the colorless redox material is present in the anode side (including a case where it is present in both the anode side and the cathode side and a case where it is present only in the anode side), the aforementioned electrochromic material is preferably absent in the anode side and present in the cathode side.

The colorless redox material can be, for example, a compound having a basic structure as shown in a formula (8):

$$(A)_m\text{-}B \qquad (8)$$

wherein A represents an acid group; B represents a hydroxylamine or a catechol; m represents an integer of 1-4 and preferably 1 or 2; and, in case m is equal to or larger than 2, A's may be same or different.

In the formula, a portion A achieves an adsorption to the anode surface and/or the cathode surface, and a portion B executes an electron transfer. A is preferably an acid group (such as a carboxyl group, a sulfo group, a phosphono group or a phosphato group), particularly preferably a phosphono group or a phosphate group. B has a structure of a hydroxylamine or a catechol as shown in the following.

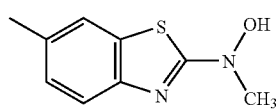

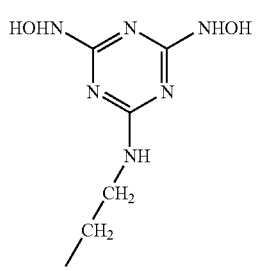

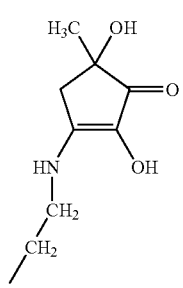

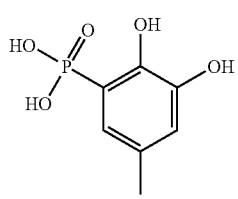

Following compounds can be cited as specific examples of the colorless redox material, but the present invention is not limited to such examples.

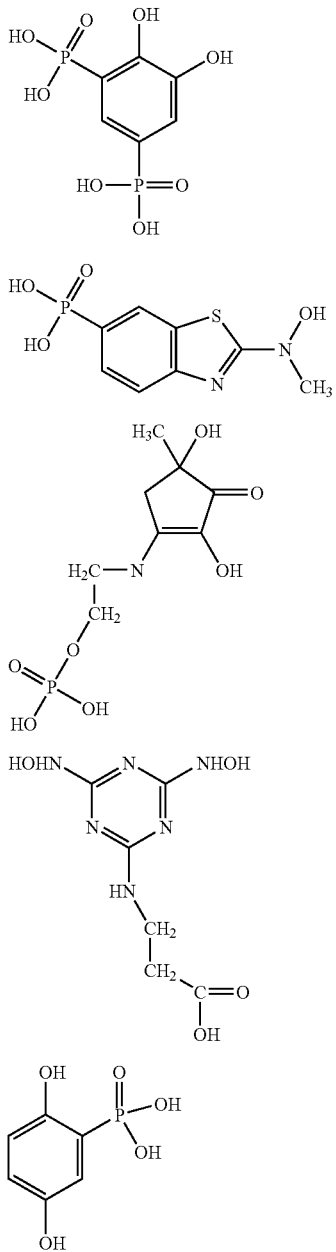

Also in order to accelerate an electrochemical reaction of the electrochromic material, an auxiliary compound that can be oxidized or reduced may be dissolved in an electrolyte liquid. The auxiliary compound may or may not show a change in the optical density in λ=400-700 nm by oxidation or reduction.

Also in order to accelerate an electrochemical reaction of the electrochromic material and the colorless redox material, an auxiliary compound that can be oxidized or reduced may be present in the optical density changing element. The auxiliary compound may or may not show a change in the optical density in λ=400-700 nm by oxidation or reduction. The auxiliary compound may be present on the metal oxide like the electrochromic material and the colorless redox material, or may be dissolved in the electrolyte or may singly form a layer on an electric conductive layer.

An electrolyte employable in the optical density changing element is preferably constituted of a solvent and a supporting electrolyte. The supporting electrolyte executes a charge transfer and is never involved in an electrochemical reaction, thereby serving to increase conductivity. The solvent is preferably a polar solvent, and can specifically be water, an alcohol such as methanol or ethanol, a carboxylic acid such as acetic acid, acetonitrile, propionitrile, glutaronitrile, adiponitrile, methoxyacetonitrile, dimethylacetamide, methylpyrrolidinone, formamide, N,N-dimethylformamide, dimethyl sulfoxide, dimethoxyethane, propylene carbonate, ethylene carbonate, γ-butyrolactone, tetrahydrofuran, dioxolane, sulfolane, trimethyl phosphate, pyridine, hexamethylenoic triamide or polyethylene glycol.

The supporting electrolyte serves as an ion and functions as a charge carrier in the solvent, and is a salt formed by a combination of easily ionizable anion and cation. The cation can be a metal ion represented by $Li^+$, $Na^+$, $K^+$, $Rb^+$ or $Cs^+$, or a quaternary ammonium ion represented by tetrabutylammonium ion. Also the anion can be a halogen ion represented by $Cl^-$, $Br^-$, $I^-$ or $F^-$, a sulfate ion, a nitrate ion, a perchlorate ion, a tosylate ion, a tetrafluoroborate ion, or a hexafluorophosphate ion. Other electrolytes include a fused salt system represented by LiCl/KCl, a solid electrolyte system represented by an ionic conductive material or an ionic superconductive material, and a solid-state polymer electrolyte system represented by a membrane-shaped ionic conductive material such as an ion exchange membrane.

In the optical density changing element of the invention, it is preferable to maintain an optical density at λ=400 nm in a color erased state at 0.2 or less, particularly preferably 0.125 or less, by suitably combining the materials employed in the optical density changing element, namely by optimizing the types of the substrate, the electroconductive layer and the electrochromic material, and by optimizing the type and the particle size of the semiconductor material. It is also preferable, in a similar manner, to maintain all of an average optical density at λ=400-500 nm in a color erased state, an average optical density at λ=500-600 nm in a color erased state, and an average optical density at λ=600-700 nm in a color erased state, at 0.1 or less. On the other hand, in a color generated state in response to an electromagnetic wave irradiation, an average optical density in λ=400-700 nm is preferably 0.5 or higher, more preferably 0.8 or higher, and particularly preferably 0.95 or higher.

The optical element of the invention includes a an electromotive force generating element, which generates an electromotive force in response to an electromagnetic wave, and an optical density changing element of the invention. In the optical element of the invention, in connecting the optical density changing element and the electromotive force generating element, they may be connected either directly or through a circuit having an amplifying or protective function. Also there may be adopted a circuit configuration having a resistor connected parallel to the optical density changing element thereby promoting cancellation of the applied voltage when the light irradiation is terminated.

The optical device of the invention, exhibiting a change in the optical density of the optical density changing element according to an electromotive force generated from the electromotive force generating element, namely according to an electromagnetic wave, can be utilized as a light regulating element of which a transmitted light amount is changed according to the intensity of the electromagnetic wave.

In the invention, an "element generating an electromotive force (electromotive force generating element) is an element for converting an electromagnetic energy into an electric energy. A specific example is a solar cell which converts solar light into an electric energy. The solar cell may be formed by various compounds such as single crystalline silicon, polycrystalline silicon, amorphous silicon, cadmium telluride or indium copper selenide, and a related solar cell utilizing such compounds may be suitably selected, in the optical element of the invention, according to the purpose.

Also a photoelectric converting element utilizing an oxide semiconductor sensitized with a dye (hereinafter represented as dye-sensitized photoelectric converting element) and a photoelectric chemical cell utilizing such element, as described in Nature (vol. 353, p. 737-740, 1991), U.S. Pat. No. 4,927,721 and JP-A No. 2002-75443, can be utilized as the electromotive force generating element in the invention. Such dye-sensitized photoelectric converting element is also preferable as the electromotive force generating element in the invention.

Also an electromagnetic wave sensor and a voltage source may be combined to form an the electromotive force generating element. The electromagnetic wave sensor in such case is not particularly restricted, and can be, for example, a phototransistor, a CdS sensor, a photodiode, a CCD, a CMOS sensor, an NMOS sensor or a solar cell. A material constituting the electromagnetic wave sensor can be suitably selected according to a wavelength of the electromagnetic wave to be responded. The voltage source is not particularly restricted and can be a dry battery, a lead battery, a diesel power generator or a wind power generator. The dry battery can be a primary battery such as an alkali dry battery or a manganese dry battery, or a secondary battery such as a nickel-cadmium battery, a nickel-hydrogen battery, or a lithium ion battery.

A preferred electromotive force generating element in the invention is a solar cell constituted of single crystalline silicon, polycrystalline silicon, or amorphous silicon, a dye-sensitized photoelectric converting element, or a combination of a phototransistor and a dry battery. In case of applying the optical element of the invention to a photographing unit (preferably camera unit), the electromotive force generating element preferably generates an electromotive force of a magnitude proportional to the intensity of an irradiating electromagnetic wave (particularly solar light).

The optical element of the invention can be applied to an automotive window material, a display apparatus or a camera-related optical element. The efficacy of the optical element of the invention can be exhibited particularly in a camera-related optical element, which is applicable to a photographing unit (preferably a camera unit) such as a large- or medium-form at camera, a single-lens reflex camera, a compact camera, a film with lens, a digital camera, a broadcasting camera, a movie film camera, a movie digital camera, a photographing unit (preferably a camera unit) for a cellular phone, or an 8-mm movie camera. Another example in which the efficacy of the optical element can be exhibited is a simple photographing system not requiring a complex control mechanism, represented by a film with lens. Still another example is a digital camera utilizing a CCD or a CMOS device as an image pickup device, in which the optical element is effective for covering a limited dynamic range of the image pickup device.

In case of mounting the optical element of the invention in a camera unit, the optical density changing element is preferably positioned on an optical axis of a lens. Also the electromotive force generating element, the optical density changing element and the photosensitive element of the camera (photosensitive material (for example a film) or CCD) preferably have an as large overlapping as possible in the optical absorption characteristics (light absorbing wavelength and spectral sensitivity). In particular, the optical density changing element and the photosensitive element of the camera preferably have an as large overlapping as possible in the spectral sensitivity range. In this manner, there can be realized a neutral gray light-regulating property over the entire spectral sensitivity range of the camera.

EXAMPLES

In the following, the present invention will be clarified further by examples, but the present invention is naturally not limited to such examples.

Example 1

An electrochromic filter 101 constituting an optical density changing element of the invention (Example 1) and an electrochromic filter 102 of a comparative example (Comparative Example 2) were prepared by steps of (i) coating of titanium oxide nanoparticles for cathode, (ii) coating of tin oxide nanoparticles for anode, (iii) adsorption of an electrochromic dye for cathode, (iv) adsorption of a colorless redox material for anode, and (v) preparation of an electrochromic filter. These steps will be explained in the following.

(i) Coating of Titanium Oxide Nanoparticles for Cathode

In an aqueous dispersion of titanium oxide of a diameter of about 10 nm, polyvinyl alcohol was added and agitated uniformly to obtain a coating liquid.

A transparent conductive glass substrate having an antireflective film (a thickness of 0.7 mm), coated with a conductive $SnO_2$ evaporated film, was prepared as a coating substrate for cathode. On the $SnO_2$ film of the transparent conductive glass, the coating liquid was coated uniformly so as to obtain an amount of titanium oxide of 6 g/m$^2$.

After the coating, the glass substrate was calcined for 30 minutes at 450° C. to eliminate the polymer component, thereby obtaining a titanium oxide nanoporous electrode. The electrode prepared in the aforementioned process had a surface roughness factor of about 750.

(ii) Coating of Tin Oxide Nanoparticles for Anode

In an aqueous dispersion of tin oxide of a diameter of about 5 nm, polyethylene glycol (molecular weight 20,000) was added and agitated uniformly to obtain a coating liquid.

A transparent conductive glass substrate having an antireflective film (a thickness of 0.7 mm), coated with a conductive $SnO_2$ evaporated film, was prepared as a coating substrate for anode. On the $SnO_2$ film of the transparent conductive glass, the coating liquid was coated uniformly.

After the coating, the coating was heated to 450° C. over 100 minutes and calcined for 30 minutes at 450° C. to eliminate the polymer. The coating and the calcining were repeated until tin oxide reached a total coating amount of 7 g/m$^2$, thereby obtaining a tin oxide nanoporous electrode. The electrode prepared in the aforementioned process had a surface roughness factor of about 750.

(iii) Adsorption of Electrochromic Material for Cathode

A following chromic dye (V-1) was employed as the electrochromic material for the cathode. The chromic dye V-1 has a property of generating a color by being reduced at the cathode (− pole).

Chronic dye (V-1)

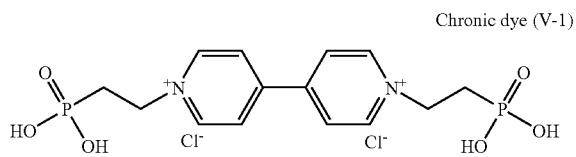

The chromic dye V-1 was dissolved in water with a concentration of 0.02 mol/l, and the titanium oxide porous electrode prepared in (i) was immersed therein, and chemical adsorption was conducted for 3 hours at 40° C. After the chemical adsorption, the electrode was rinsed with water, and was dried under vacuum.

The adsorption of the electrochromic material onto the nanoparticles may also be achieved, in addition to the immersion method described above, by mixing the material in the coating liquid thereby causing adsorption at the coating of the nanoparticles onto the transparent conductive glass in the step (i).

(iv) Adsorption of Colorless Redox Material for Cathode

A following compound (R-1) was employed as the colorless redox material for the anode. The compound R-1 can be oxidized or reduced at the anode (+ pole), but does not cause a change in the absorption spectrum in the visible range (about 400 to 700 nm) at the oxidation/reduction. It is therefore possible to accelerate the color generation of the electrochromic material on the cathode without influencing the spectrum of the color generation.

Compound (R-1)

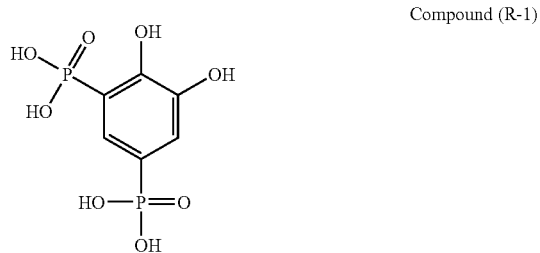

The compound R-1 was dissolved in water with a concentration of 0.02 mol/l, and the tin oxide porous electrode prepared in (ii) was immersed in the aqueous solution of the compound (R-1), and chemical adsorption was conducted for 3 hours at 40° C. After the chemical adsorption, the electrode was rinsed with water, and was dried under vacuum.

(v) Preparation of Electrochromic Filter

Figure 4:
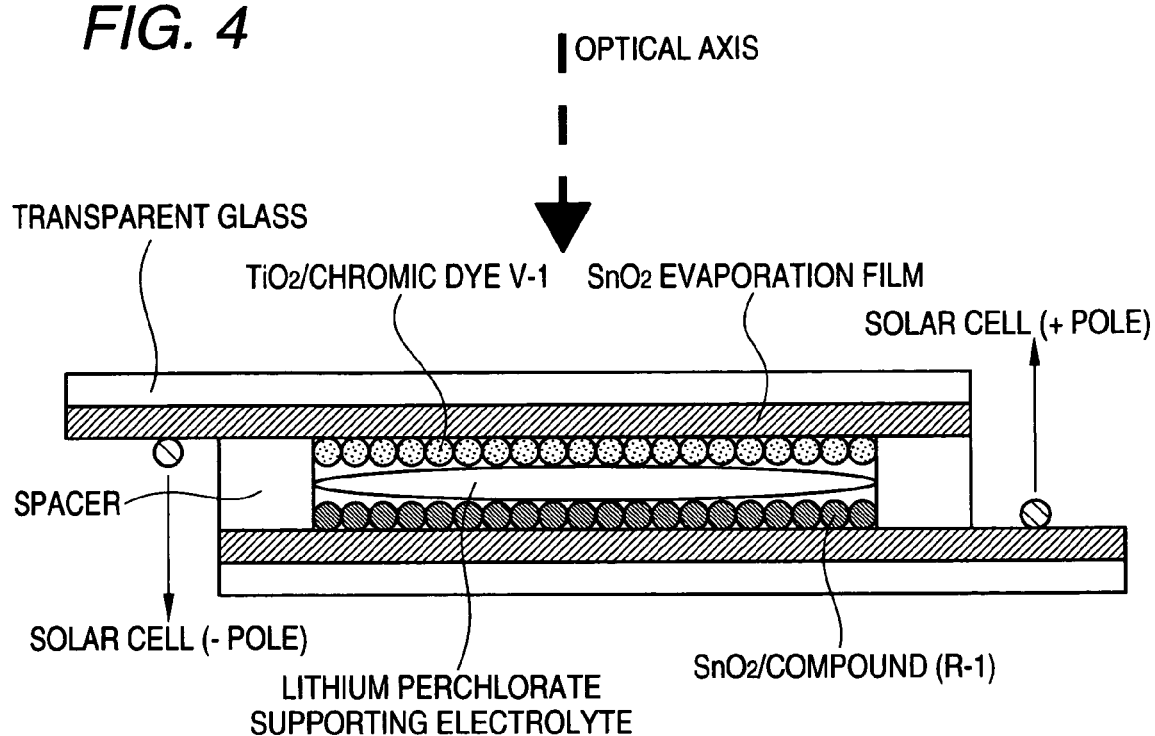
FIG. 4 shows a schematic cross-sectional view showing a configuration of an example (light regulating filter) of an optical density changing element of the present invention.

The titanium oxide nanoporous electrode adsorbing the chromic dye V-1 and the tin oxide nanoporous electrode adsorbing the compound R-1 were opposed as shown in FIG. 4, and, in a gap therebetween, a 0.2 mol/l γ-butyrolactone solution of lithium perchlorate was sealed as an electrolyte to obtain an electrochromic filter 101 (Example 1).

On the other hand, an electrochromic filter 102 of a comparative example (Comparative Example 1) in the same manner as the filter 101, except that the (iv) adsorption of the colorless redox material for anode was not conducted.

In the electrochromic filter 101 (Example 1), when a voltage of 1.5 V was applied between the titanium oxide nanoporous electrode adsorbing the chromic dye (V-1) as the cathode ((−) pole) and the tin oxide nanoporous electrode adsorbing the compound (R-1) as the anode ((+) pole), the filter showed a rapid color generation and the optical density at a wavelength 610 nm increased by 0.9 within 30 seconds. Then, when both electrodes were shortcircuited, the filter showed a rapid color erasure and returned, within 20 seconds, to the density before the voltage application.

On the other hand, in a similar voltage application on the electrochromic filter 102 (Comparative Example 1), the increase of the optical density at a wavelength of 610 nm remained at 0.7 after 30 seconds. Also the color erasure was slow when the electrodes were shortcircuited, and the density did not return to the value before the voltage application even after a lapse of 1 minute. These results are summarized in Table 1, wherein (+) is an evaluation for the result in which the optical density is within a range of ±0.03 based on the optical density before generating colors, and (−) is an evaluation for the result in which the optical density is not within the above mentioned range.

TABLE 1

|  | Compound used in cathode | Compound used in anode | Δ Generated color density | Color erasure after 30 seconds |
|---|---|---|---|---|
| Sample 101 (invention) | chromic dye (V-1) | compound (R-1) | 0.9 | + |
| Sample 102 (comparative example) | chromic dye (V-1) | none | 0.7 | − |

The foregoing results indicate that the electrochromic filter (optical density changing element) of the invention employing the colorless redox material is superior in the color generation property and the color erasing property to the electrochromic filter of Comparative Example 1 not utilizing the colorless redox material.

Example 2

An electrochromic filter 201 was prepared by changing the steps (i)-(iv) of Example 1 to following steps (i)-(iv).

(i) Coating of Tin Oxide Nanoparticles for Cathode

In an aqueous dispersion of tin oxide of a diameter of about 40 nm, polyethylene glycol (molecular weight 20,000) was added and agitated uniformly to obtain a coating liquid. A transparent glass with an antireflective layer of a thickness of 0.7 mm, coated with a conductive $SnO_2$ sputtered film, was employed as a coating substrate. On the $SnO_2$ film of the transparent conductive glass, the coating liquid was coated uniformly so as to obtain a coating amount of tin oxide of 9 g/m². After the coating, the glass substrate was calcined for 30 minutes at 450° C. to eliminate the polymer thereby obtaining a tin oxide nanoporous electrode. The electrode prepared in the aforementioned process had a surface roughness factor of about 750.

(ii) Coating of Tin Oxide Nanoparticles for Anode A tin oxide nanoporous electrode was obtained in the same manner as in Example 1.

(iii) Adsorption of Electrochromic Material for Cathode

As the electrochromic material for cathode, chromic dyes (V-7), (V-8) and (V-10) of following formulas were employed.

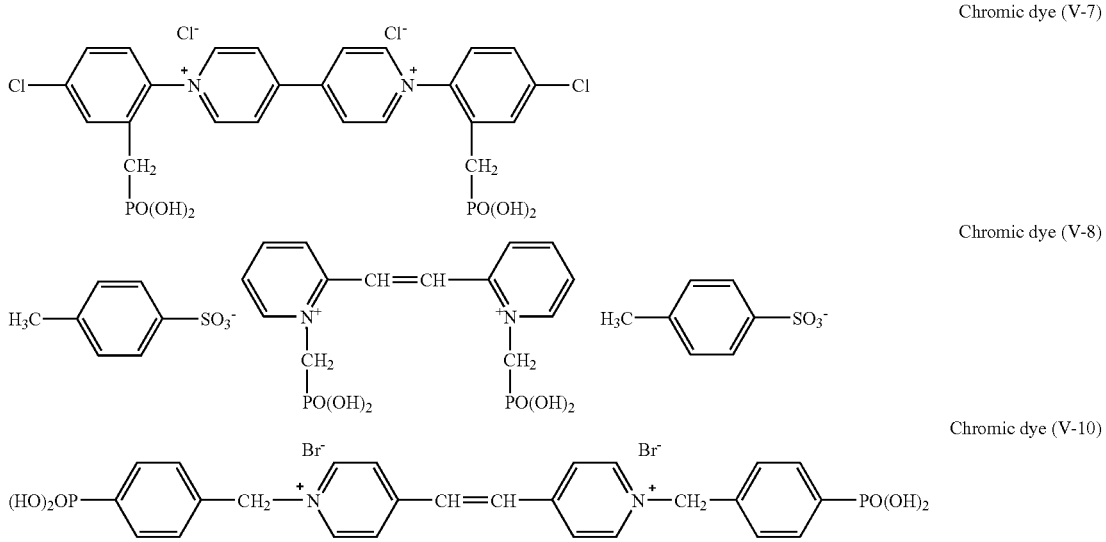

Chromic dye (V-7)

Chromic dye (V-8)

Chromic dye (V-10)

The chromic dyes (V-7), (V-8) and (V-10) were dissolved in water with a concentration of 0.02 mol/l, and the tin oxide nanoporous electrode prepared in (i) was immersed therein, and chemical adsorption was conducted for 3 hours at 40° C. After the chemical adsorption, the electrode was rinsed with water, and dried under vacuum.

(iv) Adsorption of Colorless Redox Material for Anode

The colorless redox material was adsorbed on the tin oxide nanoporous electrode as in Example 1.

The electrochromic filter 201 prepared as above is summarized in the following table.

TABLE 2

| | Compound used in cathode | Compound used in anode |
|---|---|---|
| Sample 201 (invention) | chromic dye (V-7) chromic dye (V-8) chromic dye (V-10) | compound (R-1) |

This electrochromic filter 201, in a voltage application as in Example 1, showed a rapid color generation and a rapid color erasure. In addition, it generated a color well balanced over the entire wavelength region of 400-700 nm.

Example 3

An electrochromic filter 301 was prepared by changing the steps (i)-(iv) of Example 1 to following steps (i)-(iv).

(i) Coating of Tin Oxide Nanoparticles for Cathode

A tin oxide nanoporous electrode was obtained in the same manner as in Example 2.

(ii) Coating of Tin Oxide Nanoparticles for Anode

A tin oxide nanoporous electrode was obtained in the same manner as in Example 1.

(iii) Adsorption of Colorless Redox Material for Cathode

As the colorless redox material for cathode, a compound (R-2) of a following formula was employed.

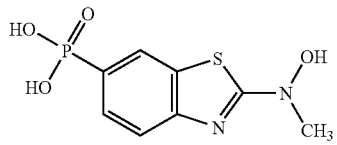

Compound (R-2)

The compound (R-2) was dissolved in water with a concentration of 0.02 mol/l, and the tin oxide nanoporous electrode for cathode prepared in (i) was immersed in the aqueous solution of the compound (R-2), and chemical adsorption was conducted for 3 hours at 40° C. After the chemical adsorption, the electrode was rinsed with water, and dried under vacuum.

(iv) Adsorption of Electrochromic Material for Anode

As the electrochromic material for anode, a chromic dye (P-1) was employed.

The chromic dye (P-1) was dissolved in a mixed solvent of chloroform and methanol with a concentration of 0.02 mol/l, and the tin oxide nanoporous electrode for anode prepared in (ii) was immersed therein, and chemical adsorption was conducted for 3 hours at 40° C. After the chemical adsorption, the electrode was rinsed with water, and dried under vacuum.

TABLE 3

| Chromic dye (P-1) | |
|---|---|
| 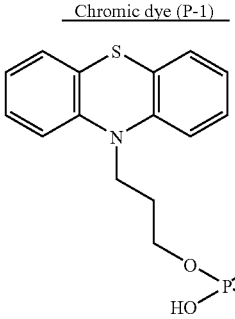 | |
| Compound used in cathode | Compound used in anode |
| Sample 301 (invention) compound (R-2) | chromic dye (P-1) |

This electrochromic filter 301, in a voltage application as in Example 1, showed an increase in the optical density by 0.9 after 20 seconds at a wavelength of 515 nm, thus achieving a rapid color generation. It also showed a rapid color erasure within 20 seconds.

Example 4

An electrochromic filter 401 was prepared by changing the steps (i)-(iv) of Example 1 to following steps (i)-(iv).

(i) Coating of Tin Oxide Nanoparticles for Cathode

A tin oxide nanoporous electrode was obtained in the same manner as in Example 2.

(ii) Coating of Tin Oxide Nanoparticles for Anode

A tin oxide nanoporous electrode was obtained in the same manner as in Example 1.

(iii) Adsorption of Electrochromic Material for Cathode and Colorless Redox Material As the electrochromic material for cathode, the chromic dye (V-1) was employed, and, as the colorless redox material for cathode, the compound (R-2) was employed.

The chromic dye (V-1) and the compound (R-2) was dissolved in water with a total concentration of 0.02 mol/l, and the tin oxide nanoporous electrode for cathode prepared in (i) was immersed therein, and chemical adsorption was conducted for 3 hours at 40° C. After the chemical adsorption, the electrode was rinsed with water, and dried under vacuum.

(iv) Adsorption of Electrochromic Material for Anode

As the electrochromic material for anode, the chromic dye (P-1) was employed.

The chromic dye (P-1) was dissolved in a mixed solvent of chloroform and methanol with a concentration of 0.02 mol/l, and the tin oxide nanoporous electrode for anode prepared in (ii) was immersed therein, and chemical adsorption was conducted for 3 hours at 40° C. After the chemical adsorption, the electrode was rinsed with water, and dried under vacuum.

TABLE 4

|  | Compound used in cathode | Compound used in anode |
| --- | --- | --- |
| Sample 401 (invention) | chromic dye (V-1) compound (R-2) | chromic dye (P-1) |

This electrochromic filter 401, in a voltage application as in Example 1, showed a rapid color generation and a rapid color erasure as in Example 3. In addition, the electrochromic filter 401 shows a dense color generation at a wavelength of about 515 nm, and a medium color generation at a wavelength of about 610 nm.

Example 5

There will be shown an example of mounting an optical element, having an optical density changing element of the invention and an electromotive force generating element, on a film-with-lens.

Figure 2:
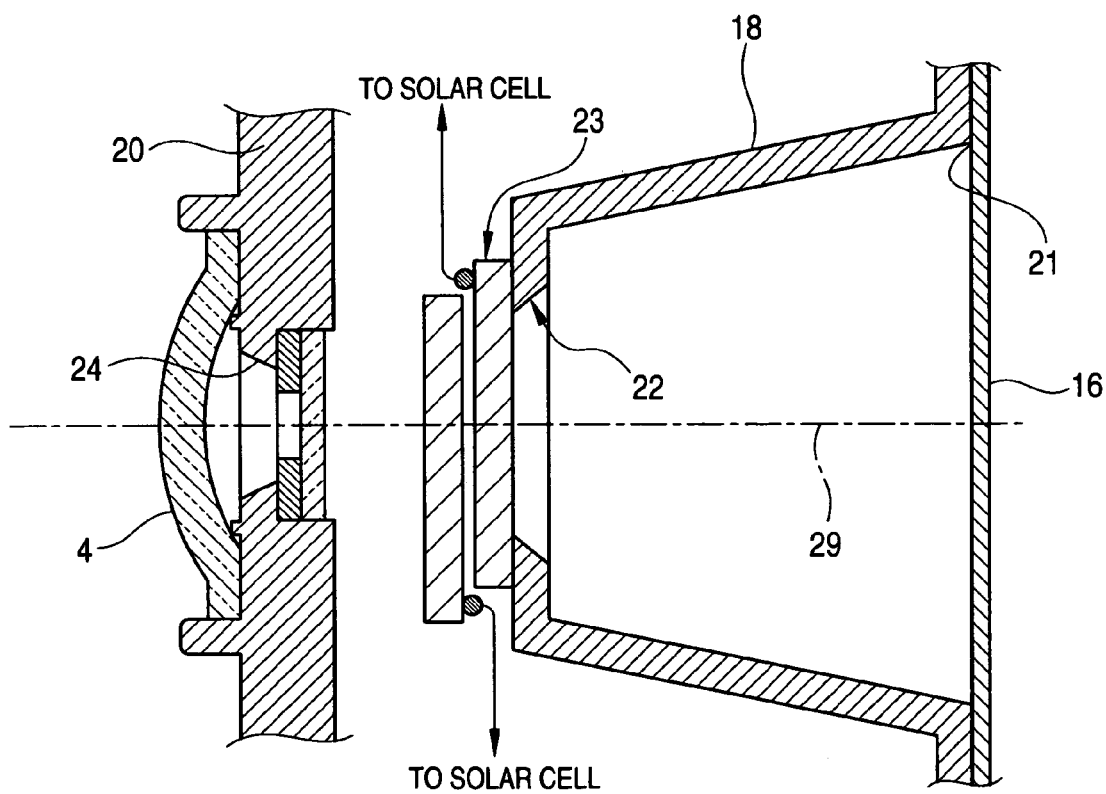
FIG. 2 shows a schematic cross-sectional view of a principal portion of a film-with-lens having an optical element of the invention.
Figure 3:
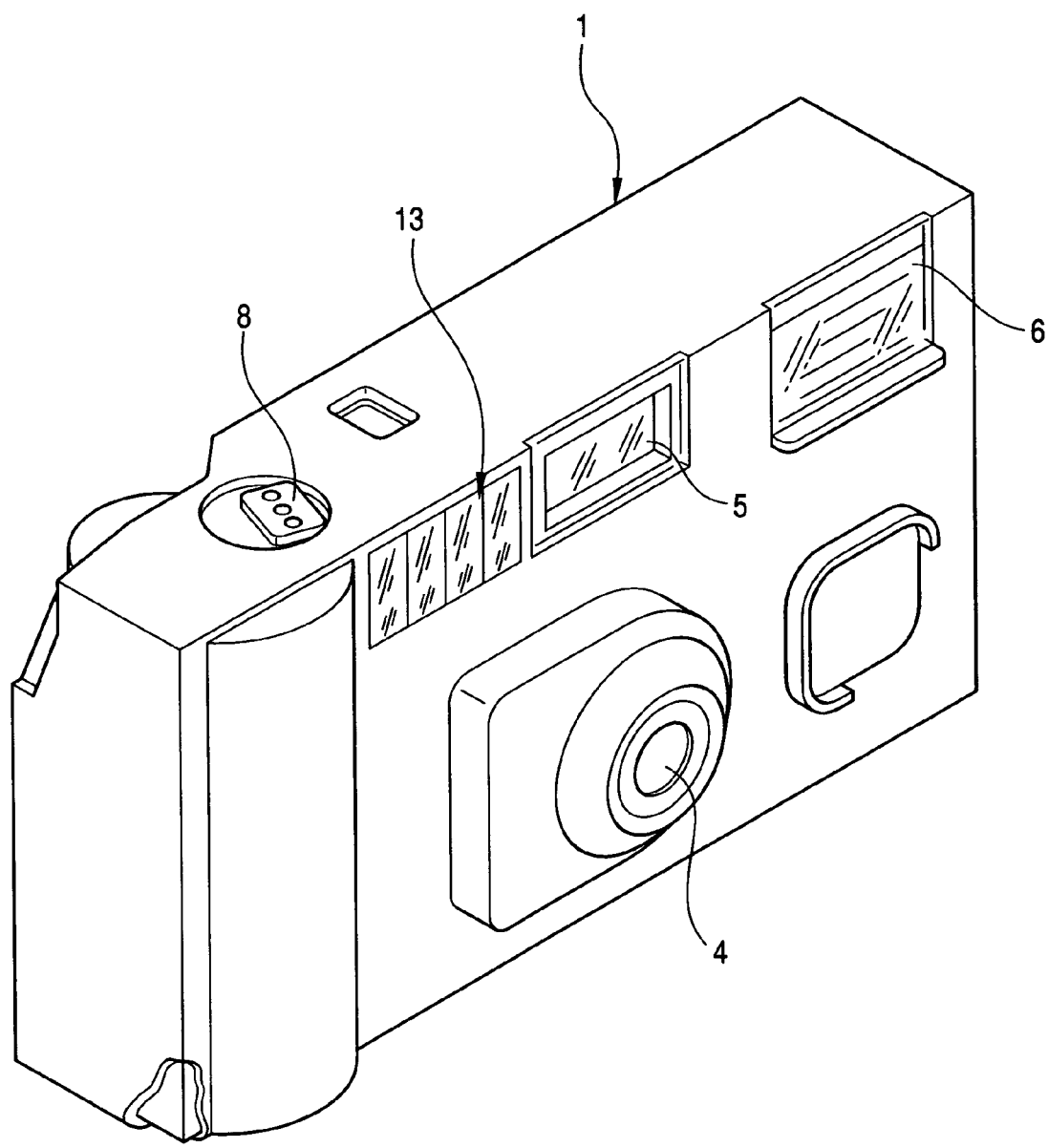
FIG. 3 shows an external view of a principal portion of a film-with-lens having an optical element of the invention.

The film-with-lens 501 of the present example is equipped, as shown in FIGS. 2 and 3, with (1) a light regulating filter 23 (optical density changing element) and (2) a solar cell 13 (electromotive force generating element). The solar cell 13 provided outside the unit generates an electromotive force corresponding to the intensity of the external light, and the light regulating filter 23 regulates the light amount arriving at a photographic film 16 according to such electromotive force thereby preventing an overexposure under a high luminance environment. In the following there will be explained details and producing methods for (1) the light regulating filter and (2) the solar cell.

(1) Light Regulating Filter

The electrochromic filter 201 prepared in Example 2 was employed as the light regulating filter.

(2) Solar Cell

Figure 5:
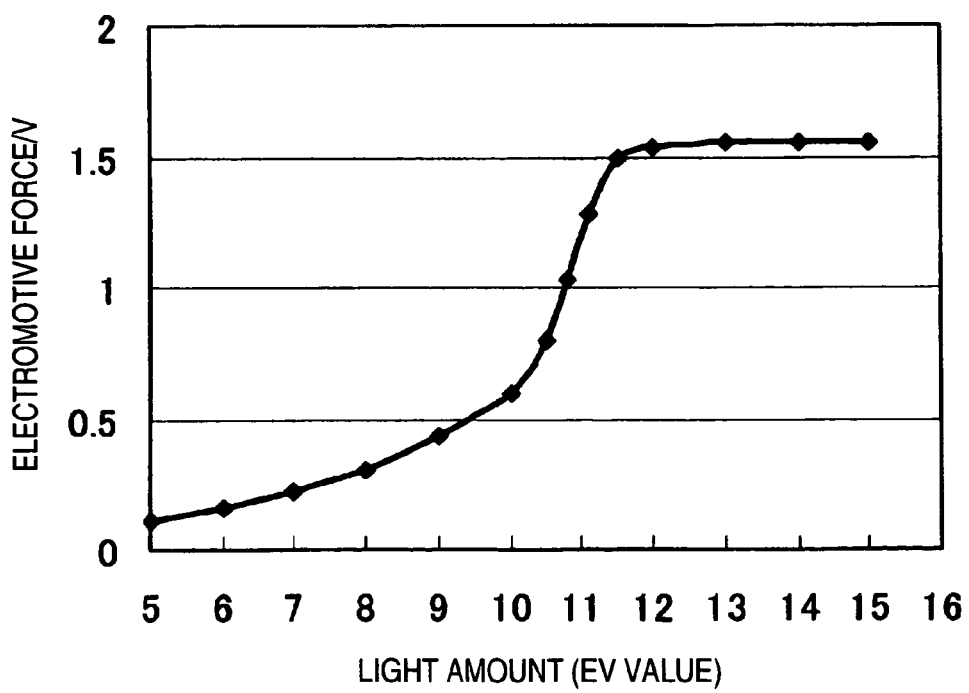
FIG. 5 shows a graph showing electromotive response characteristics of a solar cell employed in Example 5.

As the solar cell, there was employed a silicon cell SS-3012DS (manufactured by Sinonar Co.), and unit cells of such solar cell were serially connected to obtain an electromotive force of about 1.5 V. Electromotive characteristics of the used solar cell to a pseudo solar light (a xenon lamp and an AM1.5 spectral filter manufactured by Oriel Co.) are shown in FIG. 5 as a function of light amount.

The (1) light regulating filter and the (2) solar cell mentioned above were used to prepare a film-with-lens 501 of a configuration shown in Table 1. Also a film-with-lens 502 without the solar cell and the light regulating filter was used as a comparative example. It had a film sensitivity of ISO 1600, a diaphragm of F8 and a shutter speed of 1/85 sec. The photographing system constituted as explained above provides a negative image of an optimum density in a photographing operation under a condition of EV=8.4.

TABLE 5

| Sample No. | Solar cell | Light regulating filter |
| --- | --- | --- |
| 501 (invention) | present | present (electrochromic filter 201 of Example 2) |
| 502 (comparative example) | absent | absent |

Figure 6:
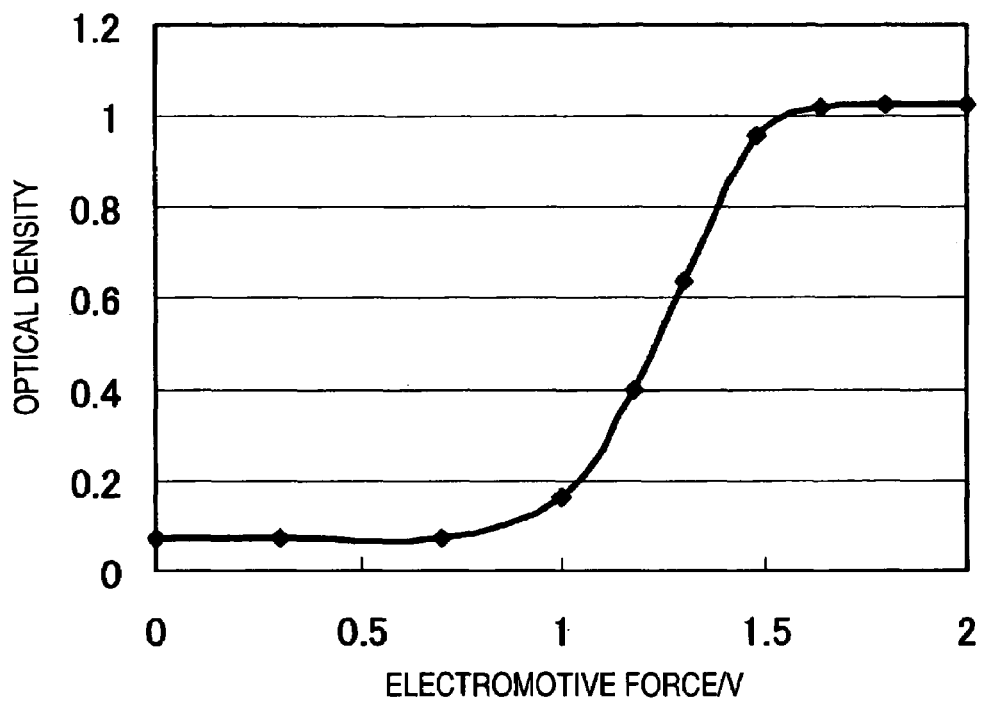
FIG. 6 shows a graph showing electromotive response characteristics of a light regulating filter prepared in Example 5.
Figure 7:
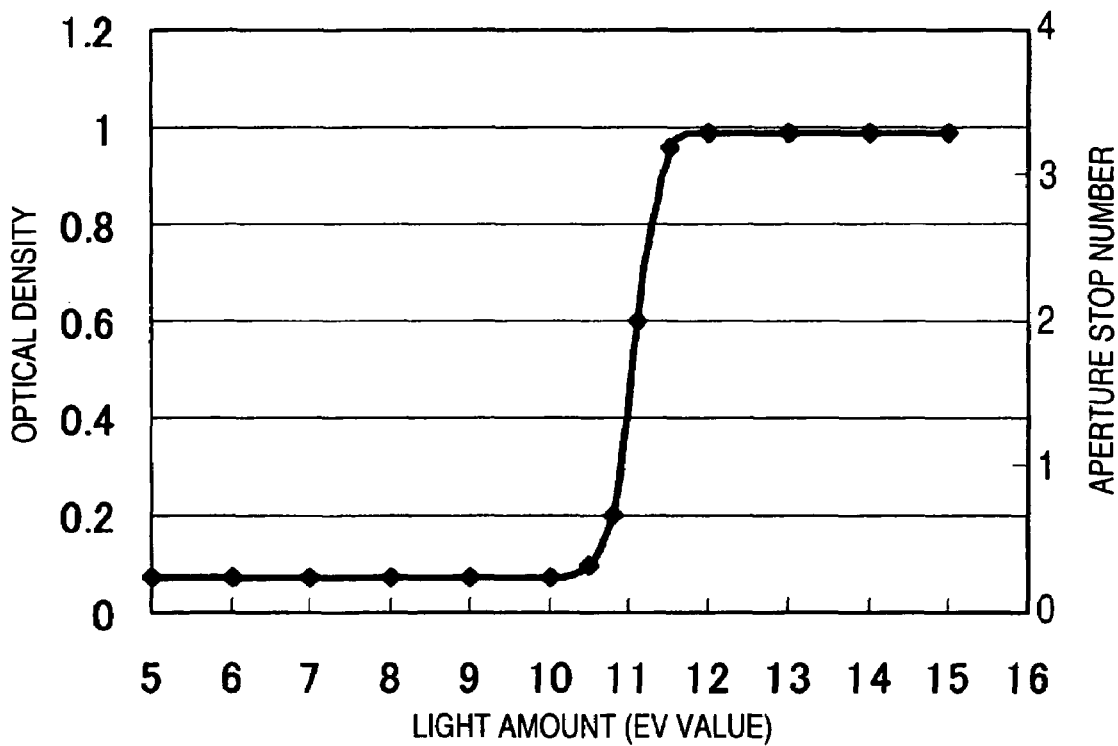
FIG. 7 shows a graph showing electromotive response characteristics of an optical element prepared in Example 5.

Optical density characteristics of the optical element employed in the sample 501 are shown in FIG. 6, as a function of the electromotive force of the solar cell. Also optical density response characteristics of the optical element, constituted of the solar cell and the light regulating filter are shown in FIG. 7, as a function of the light amount. The indicated optical density is an average over $\lambda$=400-700 nm. For example, an increase by +1 in the aperture stop number corresponds to a reduction of the transmitted light amount to ½, or to an increase in the optical density by 0.3. As shown in FIG. 7, the aperture stop number of the optical element, being +0.2 when the light is intercepted, increased to +2.0 under an irradiation of the light of EV=11.0 and to +3.2 under an irradiation of the light of EV=11.5 or higher. Such change had a response time of 5 seconds. EV is a value indicating a brightness, and is calculated from a following equation (2) from a brightness L represented by a practical unit "lux" for an illumination intensity:

$$EV=\log_2(L/2.4) \quad (2)$$

In relation to the aperture stop number mentioned above, an increase by +1 in the aperture stop number corresponds to a decrease by 1 of the EV value of the light received through the optical element.

The aforementioned film-with-lens units 501, 502 were subjected to photographing operations under brightness conditions of EV=6.4 (corresponding to a dark indoor environment) to 15.4 (corresponding a bright summer outdoor condition), and developed in a CV-16 developing process of Fuji Photo Film Co. for 3 minutes and 15 seconds. Exposure levels obtained on the negative film are shown in Table 6. An exposure level indicates an appropriateness of the negative density after the processing, with an optimum negative density represented by 0. In the photographing system employed in the present example, there is obtained an optimum negative density, or an exposure level=0 in a photographing operation under a condition EV=8.4. An exposure level +1 means a density higher than an optimum gray density by 1 stop (corresponding to an optical density higher by 0.3), and an exposure level −1 means a density lower than an optimum gray density by 1 stop (corresponding to an optical density lower by 0.3).

TABLE 6

| Sample No. | Photographing condition | | | | | | | | | |
|---|---|---|---|---|---|---|---|---|---|---|
| | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
| 501 (invention) | −2.2 | −1.2 | −0.2 | +0.8 | +1.8 | +0.0 | +0.8 | +1.8 | +2.8 | +3.8 |
| 502 (comparative example) | −2.0 | −1.0 | 0 | +1.0 | +2.0 | +3.0 | +4.0 | +5.0 | +6.0 | +7.0 |

In case of obtaining a print from thus obtained negative image, a certain aberration in the exposure level is correctable. More specifically, a correction at the printing operation is possible for negative films of exposure levels within a range from −1 to +4, and a "successfully taken photograph" can be obtained. In case the exposure level is not within the aforementioned range, a sufficient correction cannot be realized at the printing operation, thus resulting in a "failed photograph". Table 7 shows whether a photograph printed from the negative photographed under the aforementioned condition is successful or not, wherein (+) indicates a success and (−) indicates a failure.

TABLE 7

| Sample No. | Photographing condition | | | | | | | | | |
|---|---|---|---|---|---|---|---|---|---|---|
| | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
| 501 (invention) | − | − | + | + | + | + | + | + | + | + |
| 502 (comparative example) | − | + | + | + | + | + | + | − | − | − |

Table 7 indicates following results. The sample 501 having the light regulating system of the invention, in comparison with the comparative example 502 not having the light regulating system, showed a somewhat narrower photographable range under conditions of lower illumination intensity (conditions of smaller EV) but a much wider photographable range under conditions of higher illumination intensity (conditions of larger EV), thus realizing a camera system of a wider photographable range in total.

Example 6

Figure 8:
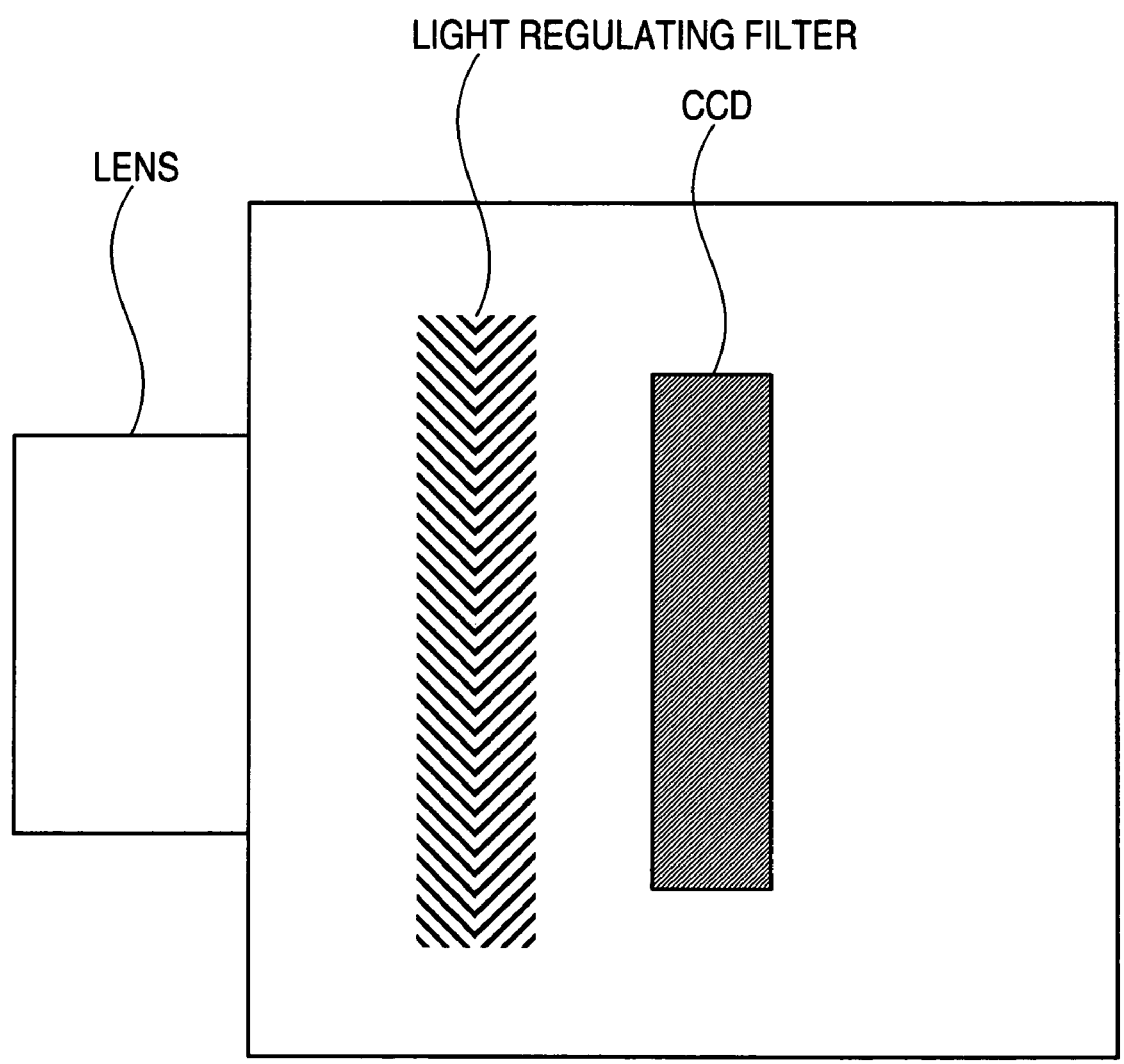
FIG. 8 shows a schematic cross-sectional view of a principal portion of an electronic still camera having an optical element of the present invention.
Figure 9:
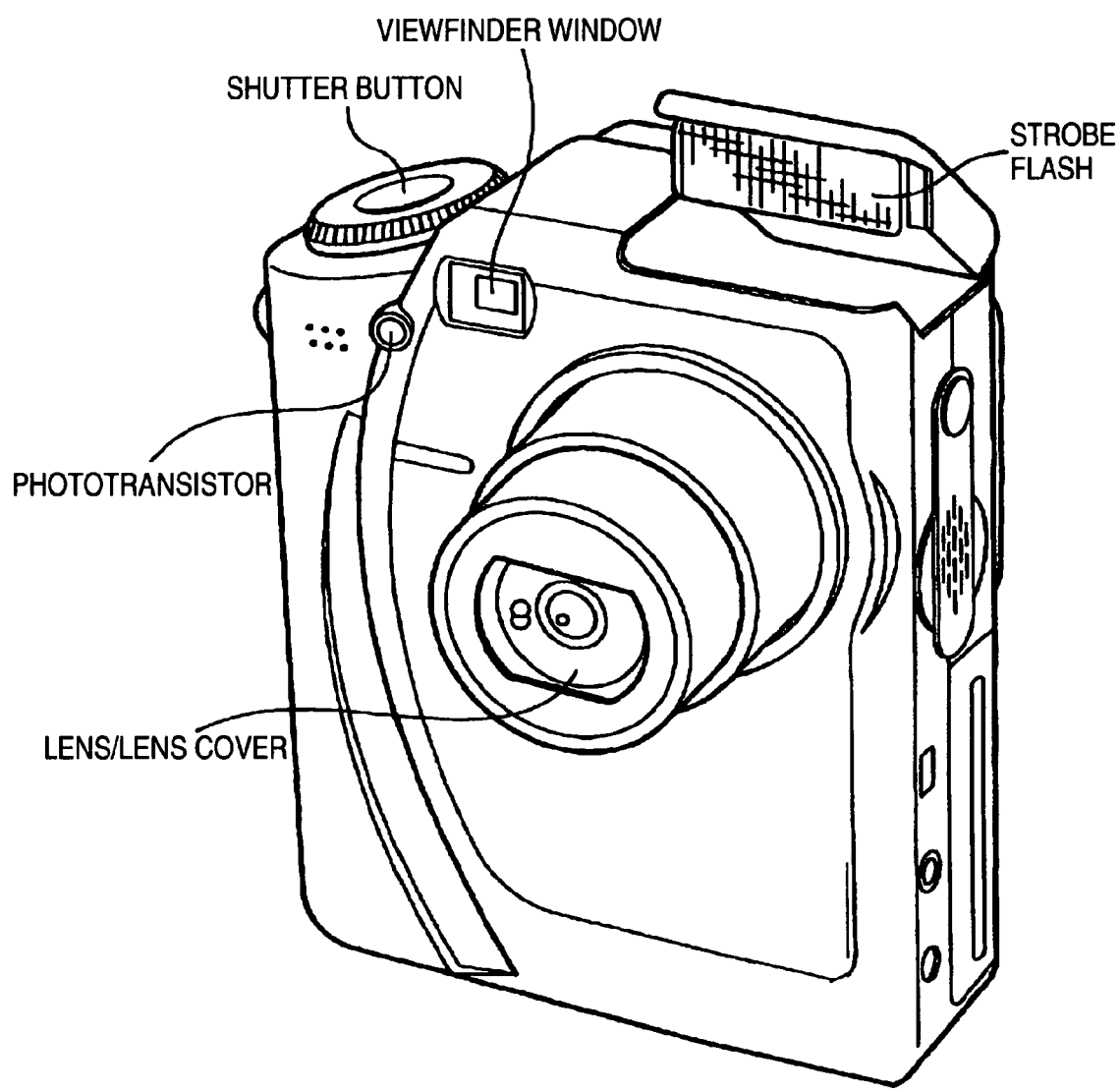
FIG. 9 shows a schematic external view of an example of an electronic still camera having an optical element of the present invention.

The present example provides an electronic still camera equipped with a light regulating filter. An electronic still camera of the present example is provided, as shown in FIG. 8, with an electrochromic filter 201 prepared in Example 2 as a light regulating filter between a lens and a CCD, and a small phototransistor (PT380 manufactured by Sharp Inc.) was mounted in an external part as shown in FIG. 9 and was so connected as to control the light regulating filter, utilizing a battery (U-3, 1.5V) incorporated in the electronic still camera as a power source. In a comparative experiment similar to that on the film-with-lens in Example 5, the invention showed a light regulating effect more conspicuous in the electronic still camera having a narrower dynamic range than in the film-with-lens.

Example 7

The present example provides a photographing unit for a cellular phone, equipped with a light regulating filter. In the photographing unit for a cellular phone, an electrochromic filter 201 prepared in Example 2 was mounted, as a light regulating filter, on a lens of a photographing unit of a cellular phone, and a small phototransistor same as in Example 6 was mounted around the photographing unit and was so connected as to control the light regulating filter, utilizing a battery incorporated in the cellular phone as a power source. The cellular phone equipped with the photographing unit of the present example was capable of photographing in wider exposure conditions in comparison with a photographing unit not equipped with the optical element of the invention.

The present invention allows to provide an optical density changing element capable of providing a color generation in an arbitrary color hue and a fast response speed, by having "a compound capable of an electron transfer to or from an electrode and causing a change in a spectral absorption spectrum of 400-700 nm as a result of the electron transfer" (electrochromic compound) and "a compound capable of an electron transfer to or from an electrode and substantially not causing a change in a spectral absorption spectrum of 400-700 nm as a result of the electron transfer" (colorless redox material) in the anode and/or cathode side.

The entire disclosure of each and every foreign patent application from which the benefit of foreign priority has been claimed in the present application is incorporated herein by reference, as if fully set forth.

What is claimed is:
1. An optical density changing element comprising:
   an anode; and
   a cathode,
   wherein at least one of the anode and the cathode comprises a first compound that changes a spectral absorption spectrum of the first compound in a wavelength of 400 to 700 nm by providing an electron to or receiving an electron from the at least one of the anode and the cathode, wherein at least one of the anode and the cathode comprises a second compound that does not substantially change a spectral absorption spectrum of the second compound in a wavelength of 400 to 700 nm by providing an electron to or receiving an electron from the at least one of the anode and the cathode, and wherein the second compound has a structure represented by formula (8):

$(A)_m\text{-}B$ (8)

wherein m represents an integer of 1 to 4;

A represents an acid group, and in case m is equal to or larger than 2, A's are mutually same or different; and B represents a hydroxylamine or a catechol.

2. The optical density changing element according to claim 1, wherein the anode comprises a second compound that does not substantially change a spectral absorption spectrum of the second compound in a wavelength of 400 to 700 nm by providing an electron to or receiving an electron from the at least one of the anode and the cathode.

3. The optical density changing element according to claim 1, wherein the anode does not comprise a first compound that changes a spectral absorption spectrum of the first compound in a wavelength of 400 to 700 nm by providing an electron to or receiving an electron from the at least one of the anode and the cathode.

4. The optical density changing element according to claim 1, wherein at least one of the anode and the cathode comprises a nanoporous semiconductor material of a roughness factor of 20 or larger.

5. The optical density changing element according to claim 1, wherein the optical density changing element in a color erased state has an optical density of 0.2 or less at a wavelength of 400 nm.

6. The optical density changing element according to claim 1, wherein the optical density changing element in a color erased state has an average optical density of 0.1 or less in each of a wavelength range of 400 to 500 nm, a wavelength range of 500 to 600 nm and a wavelength range of 600 to 700 nm.

7. An optical element comprising:

an electromotive force generating element for generating an electromotive force in response to an electromagnetic wave; and an optical density changing element according to claim 1, which changes an optical density of the optical density changing element according to the electromotive force.

8. A photographing unit comprising an optical element according to claim 7.

9. The photographing unit according to claim 8, wherein the photographing unit is a film with lens.

* * * * *